US011326087B2

(12) United States Patent
Al-Yami et al.

(10) Patent No.: US 11,326,087 B2
(45) Date of Patent: *May 10, 2022

(54) COMPOSITIONS FOR SEALING AN ANNULUS OF A WELLBORE

(71) Applicant: Saudi Arabian Oil Company, Dhahran (SA)

(72) Inventors: Abdullah Al-Yami, Dhahran (SA); Ali Alsafran, Dhahran (SA); Vikrant Wagle, Abqaiq (SA); Hussain Albahrani, Qatif (SA); Zainab Alsaihati, Saihat (SA)

(73) Assignee: Saudi Arabian Oil Company, Dhahran (SA)

( * ) Notice: Subject to any disclaimer, the term of this patent is extended or adjusted under 35 U.S.C. 154(b) by 76 days.

This patent is subject to a terminal disclaimer.

(21) Appl. No.: 16/906,607

(22) Filed: Jun. 19, 2020

(65) Prior Publication Data
US 2020/0317983 A1 Oct. 8, 2020

Related U.S. Application Data

(62) Division of application No. 16/117,902, filed on Aug. 30, 2018.

(51) Int. Cl.
| C09K 8/44 | (2006.01) |
| E21B 33/138 | (2006.01) |
| E21B 33/14 | (2006.01) |
| C04B 26/14 | (2006.01) |
| C04B 28/04 | (2006.01) |
| C09K 8/46 | (2006.01) |
| E21B 21/00 | (2006.01) |
| C04B 103/10 | (2006.01) |

(52) U.S. Cl.
CPC ............. *C09K 8/44* (2013.01); *C04B 26/14* (2013.01); *C04B 28/04* (2013.01); *C09K 8/46* (2013.01); *E21B 21/003* (2013.01); *E21B 33/138* (2013.01); *E21B 33/14* (2013.01); *C04B 2103/10* (2013.01)

(58) Field of Classification Search
None
See application file for complete search history.

(56) References Cited

U.S. PATENT DOCUMENTS

| 3,250,330 A | 5/1966 | Smith, Jr. |
| 3,476,189 A | 11/1969 | Bezemer et al. |
| 3,565,176 A | 2/1971 | Wittenwyler |
| 3,646,999 A | 3/1972 | Hamby, Jr. et al. |
| 3,915,232 A | 10/1975 | Gruesbeck et al. |
| 4,003,873 A | 1/1977 | Smith |
| 4,042,032 A | 8/1977 | Anderson et al. |
| 4,072,194 A | 2/1978 | Cole et al. |
| 4,199,484 A | 4/1980 | Murphey |
| 4,247,430 A | 1/1981 | Constien |
| 4,665,988 A | 5/1987 | Murphey et al. |
| 4,730,675 A | 3/1988 | Wygant et al. |
| 4,749,042 A | 6/1988 | Wu |
| 4,799,553 A | 1/1989 | Wu |
| 5,178,218 A | 1/1993 | Dees |
| 5,712,314 A | 1/1998 | Surles et al. |
| 5,770,657 A | 6/1998 | Chou et al. |
| 5,873,413 A | 2/1999 | Chatterji et al. |
| 5,875,844 A | 3/1999 | Chatterji et al. |
| 5,875,845 A | 3/1999 | Chatterji et al. |
| 5,911,282 A | 6/1999 | Onan et al. |
| 5,959,061 A | 9/1999 | Neumann et al. |
| 6,016,870 A | 1/2000 | Deprashad et al. |
| 6,124,246 A | 9/2000 | Heathman et al. |
| 6,196,316 B1 | 3/2001 | Bosma et al. |
| 6,234,251 B1 | 5/2001 | Chatterji et al. |
| 6,271,181 B1 | 8/2001 | Chatterji et al. |
| 6,316,529 B1 | 11/2001 | Temme et al. |
| 6,321,841 B1 | 11/2001 | Eoff et al. |
| 6,328,106 B1 | 12/2001 | Griffith et al. |
| 6,448,206 B1 | 9/2002 | Griffith et al. |
| 6,450,260 B1 | 9/2002 | James et al. |
| 6,478,088 B1 | 11/2002 | Hansen |
| 6,802,375 B2 | 10/2004 | Bosma et al. |

(Continued)

FOREIGN PATENT DOCUMENTS

| CA | 2709646 A1 | 7/2009 |
| CN | 101451061 A | 6/2009 |

(Continued)

OTHER PUBLICATIONS

U.S. Office Action dated Sep. 7, 2021 pertaining to U.S. Appl. No. 16/117,902, filed Aug. 30, 2018, 29 pages.
U.S. Office Action dated Sep. 10, 2021 pertaining to U.S. Appl. No. 16/718,784, filed Dec. 18, 2019, 81 pages.
Examination Report dated Aug. 31, 2020 pertaining to GCC Patent Application No. 2019/37457.
Office Action dated May 7, 2021 pertaining to U.S. Appl. No. 16/117,902, filed Aug. 30, 2018, 76 pages.
Office Action dated May 25, 2021 pertaining to U.S. Appl. No. 16/829,470, filed Mar. 25, 2020, 25 pages.
Office Action dated May 21, 2021 pertaining to U.S. Appl. No. 16/826,989, filed Mar. 23, 2020, 25 pages.
International Search Report and Written Opinion dated Jul. 23, 2020 pertaining to International application No. PCT/US2020/028050 filed Apr. 14, 2020, 15 pgs.
International Search Report and Written Opinion dated Jul. 23, 2020 pertaining to International application No. PCT/US2020/028082 filed Apr. 14, 2020, 15 pgs.

(Continued)

*Primary Examiner* — Anuradha Ahuja
(74) *Attorney, Agent, or Firm* — Dinsmore & Shohl, LLP

(57) ABSTRACT

A sealing composition for sealing an annulus of a wellbore includes from 20 weight percent to 97 weight percent epoxy resin based on the total weight of the composition. The epoxy resin comprising at least one of 2,3-epoxypropyl o-tolyl ether, alkyl glycidyl ethers having from 12 to 14 carbon atoms, or a compound having formula $(OC_2H_3)$—$CH_2$—O—$R^1$—O—$CH_2$—$(C_2H_3O)$, where $R^1$ is a linear or branched hydrocarbyl having from 4 to 24 carbon atoms. The sealing composition also includes from 1 weight percent to 20 weight percent curing agent based on the total weight of the composition.

22 Claims, No Drawings

(56) References Cited

U.S. PATENT DOCUMENTS

| | | |
|---|---|---|
| 6,838,317 B2 | 1/2005 | Reddy et al. |
| 6,880,642 B1 | 4/2005 | Garrett et al. |
| 7,673,686 B2 | 3/2010 | Nguyen et al. |
| 7,762,329 B1 | 7/2010 | Morgan et al. |
| 7,926,591 B2 | 4/2011 | Nguyen et al. |
| 7,956,017 B2 | 6/2011 | Gatlin et al. |
| 7,975,764 B2 | 7/2011 | Sullivan et al. |
| 8,157,009 B2 | 4/2012 | Patil et al. |
| 8,235,116 B1 | 8/2012 | Burts, Jr. et al. |
| 8,273,426 B1 | 9/2012 | Laramay et al. |
| 8,307,899 B2 | 11/2012 | Brennis et al. |
| 8,664,285 B2 | 3/2014 | Birnbrich et al. |
| 8,789,595 B2 | 7/2014 | Guerrero et al. |
| 8,857,515 B2 | 11/2014 | Ast et al. |
| 8,936,087 B2 | 1/2015 | Nguyen et al. |
| 8,944,164 B2 | 2/2015 | Veldman et al. |
| 8,946,130 B2 | 2/2015 | Zamora et al. |
| 9,150,775 B2 | 10/2015 | Ostvold |
| 9,321,953 B1 | 4/2016 | Ferrell, Jr. et al. |
| 9,410,066 B2 | 8/2016 | Ghassemzadeh |
| 9,701,885 B2 | 7/2017 | Husein et al. |
| 9,828,293 B2 | 11/2017 | Yadav et al. |
| 9,902,891 B2 | 2/2018 | Hundt et al. |
| 9,932,510 B2 | 4/2018 | Walker et al. |
| 10,005,930 B2 | 6/2018 | Reddy |
| 10,081,755 B2 | 9/2018 | Ballard |
| 10,138,405 B2 | 11/2018 | Kulkarni et al. |
| 10,144,858 B2 | 12/2018 | Kennedy et al. |
| 2001/0035111 A1* | 11/2001 | Gienau .................. C08G 59/50 106/696 |
| 2002/0020530 A1 | 2/2002 | Griffith et al. |
| 2006/0219405 A1 | 10/2006 | Nguyen et al. |
| 2007/0093393 A1 | 4/2007 | Navarrete et al. |
| 2007/0102156 A1 | 5/2007 | Nguyen et al. |
| 2008/0110624 A1 | 5/2008 | Nguyen et al. |
| 2008/0277117 A1 | 11/2008 | Burts, Jr. et al. |
| 2010/0326660 A1 | 12/2010 | Ballard et al. |
| 2011/0088916 A1 | 4/2011 | Heijnen |
| 2011/0203795 A1 | 8/2011 | Murphy et al. |
| 2011/0284247 A1 | 11/2011 | Zamora et al. |
| 2011/0308799 A1 | 12/2011 | Tarafdar et al. |
| 2012/0328377 A1 | 12/2012 | Brenneis et al. |
| 2013/0008654 A1 | 1/2013 | Deville et al. |
| 2013/0105162 A1 | 5/2013 | Abad et al. |
| 2013/0178590 A1 | 7/2013 | Jin et al. |
| 2013/0292116 A1 | 11/2013 | Nguyen et al. |
| 2014/0027116 A1 | 1/2014 | Suresh et al. |
| 2014/0076563 A1 | 3/2014 | Lin et al. |
| 2014/0083702 A1 | 3/2014 | Godfrey et al. |
| 2014/0367105 A1 | 12/2014 | Karcher et al. |
| 2015/0152708 A1 | 6/2015 | Smith |
| 2015/0167424 A1 | 6/2015 | Richards et al. |
| 2015/0232719 A1* | 8/2015 | Pfeil ..................... C08G 59/50 523/457 |
| 2016/0046853 A1* | 2/2016 | Chatterji ................ C04B 28/02 166/292 |
| 2016/0177167 A1* | 6/2016 | Hundt ..................... E21B 33/14 507/244 |
| 2016/0194544 A1 | 7/2016 | Jones et al. |
| 2016/0194548 A1 | 7/2016 | Xie et al. |
| 2016/0208157 A1 | 7/2016 | Vo et al. |
| 2016/0272875 A1 | 9/2016 | Ghumare et al. |
| 2016/0362599 A1 | 12/2016 | Wadekar et al. |
| 2017/0009122 A1 | 1/2017 | Funkhouser et al. |
| 2017/0130554 A1 | 5/2017 | Jones et al. |
| 2017/0137562 A1 | 5/2017 | Zheng et al. |
| 2017/0247607 A1 | 8/2017 | Hundt |
| 2017/0349804 A1 | 12/2017 | Kellum et al. |
| 2017/0350212 A1 | 12/2017 | Sabins et al. |
| 2018/0066489 A1 | 3/2018 | Pipchuk et al. |
| 2018/0216437 A1 | 8/2018 | Shafer |
| 2018/0346801 A1 | 12/2018 | Dandawate et al. |
| 2019/0249067 A1 | 8/2019 | Wagle et al. |
| 2020/0024503 A1 | 1/2020 | Watters et al. |
| 2021/0040376 A1 | 2/2021 | Devarapalli et al. |

FOREIGN PATENT DOCUMENTS

| | | |
|---|---|---|
| EP | 898049 A1 | 2/1999 |
| EP | 898050 A1 | 2/1999 |
| EP | 899415 A1 | 3/1999 |
| EP | 899416 A1 | 3/1999 |
| EP | 903461 A2 | 3/1999 |
| EP | 1031544 A2 | 8/2000 |
| EP | 2166028 A1 | 3/2010 |
| WO | 2014036218 A1 | 3/2014 |
| WO | 2014074112 A1 | 5/2014 |
| WO | 2014197827 A1 | 12/2014 |
| WO | 2014200889 A1 | 12/2014 |
| WO | 2015023186 A1 | 2/2015 |
| WO | 2015040241 A1 | 3/2015 |
| WO | 2016043979 A1 | 3/2016 |
| WO | 2016048303 A1 | 3/2016 |
| WO | 2016048332 A1 | 3/2016 |
| WO | 2016080974 A1 | 5/2016 |
| WO | 2016093827 A1 | 6/2016 |
| WO | 2016111674 A1 | 7/2016 |
| WO | 2017204812 A1 | 11/2017 |
| WO | 2019091900 A1 | 5/2019 |

OTHER PUBLICATIONS

Examination Report dated May 6, 2020 pertaining to GCC Patent Application No. 2019/37457.

International Search Report and Written Opinion dated Jun. 1, 2021 pertaining to International application No. PCT/US2021/018660 filed Feb. 19, 2021, 14 pages.

U.S. Office Action dated Jul. 23, 2021 pertaining to U.S. Appl. No. 16/718,716, filed Dec. 18, 2019, 28 pages.

Notice of Allowance and Fee(s) Due dated Aug. 12, 2021 pertaining to U.S. Appl. No. 16/117,974, filed Aug. 30, 2018, 14 pages.

Notice of Allowance and Fee(s) Due dated Aug. 3, 2021 pertaining to U.S. Appl. No. 16/826,989, filed Mar. 23, 2020, 14 pages.

Notice of Allowance and Fee(s) Due dated Aug. 5, 2021 pertaining to U.S. Appl. No. 16/829,470, filed Mar. 25, 2020, 12 pages.

Bhaisora et al., "Innovative Application of Ultra-Lightweight Epoxy Resin-Cement Slurry Mixture Achieved Zonal Isolation Objectives and Secured Well Integrity: Case History From Offshore Gulf of Suez", IPTC-18504-MS, 2015.

Foianini et al., "Successful Identification and Bond Assessment of Epoxy-Based Resin Cement Behind Production Casing: Integrating Cementing Technology with New Log Interpretation Methodology To Provide an Innovative Well Integrity Solution", SPWLA 55th Annual Logging Symposium, May 18-22, 2014.

Moe et al., "Anular pressure buildup: What it is and what to do about it", World Oil Deepwater Technology Supplement, Issue, p. 21-23, Aug. 2000.

Morris et al., "Resin-Based Cement Alternatives for Deepwater Well Construction", Society of Petroleum Engineers, SPE-155613-MS, 2012.

Nelson et al., "Well Cementing Fundamentals", Oilfield Review Summer, vol. 24, No. 2, pp. 59-60, 2012.

International Search Report and Written Opinion dated Mar. 15, 2019 pertaining to International application No. PCT/US2018/060282 filed Nov. 12, 2018, 13 pgs.

International Search Report and Written Opinion dated Jun. 21, 2019 pertaining to International application No. PCT/US2019/026882 filed Apr. 11, 2019, 14 pgs.

Office Action dated Sep. 30, 2019 pertaining to U.S. Appl. No. 16/117,974, filed Aug. 30, 2018, 35 pgs.

Office Action dated Nov. 13, 2019 pertaining to U.S. Appl. No. 16/515,673, filed Jul. 18, 2019, 23 pgs.

Office Action dated Nov. 18, 2019 pertaining to U.S. Appl. No. 16/117,950, filed Aug. 30, 2018, 22 pgs.

Cestari, A. R. et al., "Synthesis, characterization and hydration analysis of a novel epoxy/superplasticizer oilwell cement slurry Some mechanistic features by solution microcalorimetry" Journal of Colloid and Interface Science, Apr. 27, 2012, pp. 359-368, vol. 392.

(56) References Cited

OTHER PUBLICATIONS

Elyas, O. et al. "Use of Polymer Resins for Surface Annulus Isolation Enhancement" SPE-192266-MS, Society of Petroleum Engineers, Apr. 26, 2018, pp. 1-8.
Al-Yami, A. et al. "Optimum Practices to Mitigate Gas Migration Problems in Deep Gas Wells" SPE-187700-MS, Society of Petroleum Engineers, Oct. 18, 2017, pp. 1-21.
Alsaihati, Z. A. et al. "An Overview of Polymer Resin Systems Deployed for Remedial Operations in Saudi Arabia" SPE-188122-MS, Society of Petroleum Engineers, Apr. 27, 2017, pp. 1-15.
International Search Report and Written Opinion dated Nov. 7, 2019 pertaining to International application No. PCT/US2019/047846 filed Aug. 23, 2019.
International Search Report and Written Opinion dated Nov. 7, 2019 pertaining to International application No. PCT/US2019/047842 filed Aug. 23, 2019.
Office Action dated Mar. 10, 2020 pertaining to U.S. Appl. No. 16/117,974, filed Aug. 30, 2018, 39 pgs.
Notice of Allowance and Fee(s) Due dated Mar. 12, 2020 pertaining to U.S. Appl. No. 16/117,950, filed Aug. 30, 2018, 16 pgs.
Office Action dated May 8, 2020 pertaining to U.S. Appl. No. 16/515,673, filed Jul. 18, 2019, 41 pgs.
Office Action dated Jun. 24, 2020 pertaining to U.S. Appl. No. 16/117,974, filed Aug. 30, 2018, 41 pgs.
Office Action dated Jan. 27, 2021 pertaining to U.S. Appl. No. 16/826,989, filed Mar. 23, 2020, 58 pgs.
Office Action dated Jan. 28, 2021 pertaining to U.S. Appl. No. 16/829,470, filed Mar. 25, 2020, 51 pgs.
U.S. Office Action dated Oct. 12, 2021 pertaining to U.S. Appl. No. 16/718,716, filed Dec. 18, 2019, 21 pages.
U.S. Office Action dated Oct. 13, 2021 pertaining to U.S. Appl. No. 16/515,673, filed Jul. 18, 2019, 64 pages.
Office Action dated Nov. 17, 2020 pertaining to U.S. Appl. No. 16/117,974, filed Aug. 30, 2018, 46 pgs.
Office Action dated Mar. 11, 2021 pertaining to U.S. Appl. No. 16/117,974, filed Aug. 30, 2018, 43 pgs.
Office Action dated Oct. 6, 2020 pertaining to U.S. Appl. No. 16/809,892, filed Mar. 5, 2020, 44 pgs.
Office Action dated Oct. 6, 2020 pertaining to U.S. Appl. No. 16/809,822, filed Mar. 5, 2020, 44 pgs.
Notice of Allowance and Fee(s) Due dated Dec. 10, 2020 pertaining to U.S. Appl. No. 16/809,892, filed Mar. 5, 2020, 14 pgs.
International Search Report and Written Opinion dated Dec. 11, 2020 pertaining to International application No. PCT/US2020/050616 filed Sep. 14, 2020, 13 pgs.
Notice of Allowance and Fee(s) Due dated Dec. 30, 2020 pertaining to U.S. Appl. No. 16/809,822, filed Mar. 5, 2020, 13 pgs.
Office Action dated Feb. 18, 2021 pertaining to U.S. Appl. No. 16/718,716, filed Dec. 18, 2019, 66 pgs.
U.S. Office Action dated Feb. 3, 2022 pertaining to U.S. Appl. No. 16/718,784, filed Dec. 18, 2019, 21 pages.
U.S. Notice of Allowance and Fee(s) Due dated Feb. 9, 2022 pertaining to U.S. Appl. No. 16/117,902, filed Aug. 30, 2018, 15 pages.
U.S. Notice of Allowance and Fee(s) Due dated Feb. 7, 2022 pertaining to U.S. Appl. No. 16/718,716, filed Dec. 18, 2019, 13 pages.
U.S. Office Action dated Feb. 14, 2022 pertaining to U.S. Appl. No. 16/515,673, filed Jul. 18, 2019, 22 pages.

\* cited by examiner

COMPOSITIONS FOR SEALING AN ANNULUS OF A WELLBORE

CROSS REFERENCE TO RELATED APPLICATION(S)

This application is a divisional application of U.S. patent application Ser. No. 16/117,902, filed on Aug. 30, 2018, the entire contents of which are incorporated by reference in this disclosure.

TECHNICAL FIELD

Embodiments of the present disclosure generally relate to natural resource well drilling and, more specifically, to sealing compositions and methods for sealing the wellbore annulus or casing-casing annuli in a wellbore.

BACKGROUND

Extracting subterranean hydrocarbon sources may require drilling a hole from the surface to the subterranean geological formation housing the hydrocarbons. Specialized drilling techniques and materials are utilized to form the bore hole and extract the hydrocarbons. Specialized materials utilized in drilling operations include materials for sealing the casing-casing annulus of the wellbore, which may be formulated for specific downhole conditions.

A wellbore is a hole that extends from the surface to a location below the surface to permit access to hydrocarbon-bearing subterranean formations. The wellbore contains at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore.

The fluid conduit may be defined by one or more tubular strings having at least two openings (typically on opposing ends) with an enclosing surface having an interior and exterior surface. The interior surface acts to define the bounds of the fluid conduit. Examples of tubular strings and portions of tubular strings used in the wellbore as fluid conduits or for making or extending fluid conduits include casing, production liners, coiled tubing, pipe segments, tubes, pipe strings, mechanical structures with interior voids, or combinations of these. A tubular string may include an assembly of several shorter tubular strings connected to one another, such as joined pipe segments or casing.

When positioning a tubular string or a portion of a tubular string in the wellbore, the volume between the exterior surfaces of the tubular string and the wellbore wall forms and defines a wellbore annulus. The wellbore annulus has a volume in between the external surface of the tubular string and the wellbore wall. Additional casing-casing annuli may be formed by installing progressively smaller tubular strings within the larger tubular string initially secured in the wellbore. Installing each tubular string includes positioning the tubular string in the wellbore and placing a sealing material in the wellbore annulus or the casing-casing annulus to seal the annulus.

Primary sealing refers to the process of initially sealing the annulus upon installation of the casing or other tubular string and may refer to initial sealing of the annulus between the exterior surface of the tubular string and the wellbore wall of the wellbore or initial sealing of a casing-casing annulus between two tubular strings installed in the wellbore. Primary sealing forms a protective solid sheath around the exterior surface of the tubular string. Primary sealing may anchor and support the tubular string in the wellbore and may protect the tubular string from corrosion caused by fluids from the hydrocarbon-containing formation. Primary sealing may also provide a hydraulic seal in the annulus that may prevent migration of gases and liquids from one side of the solid sealing composition to the other. This hydraulic seal may prevent fluid communication between production zones in the wellbore, referred to as zonal isolation, or may prevent migration of fluids to the surface.

Primary sealing in conventional wellbore installations are performed with cement compositions and, thus, may be commonly referred to as "primary cementing." In conventional wellbore installations, the cement composition is pumped into the annulus and allowed to cure to form a cement sheath around the exterior surface of the tubular string. During production, this cement sheath is subjected to temperature and pressure cycling. This temperature and pressure cycling may cause micro-cracks to form in the cement sheath. Fluids, such as gas or liquids, may migrate through the micro-cracks, which may cause pressure buildup in the annuli, referred to as casing-casing annulus pressure. Increasing casing-casing annulus pressure caused by micro-cracks in the cement sheath may cause damage to interior structures of the well, such as interior casings and production liners. Greater casing-casing annulus pressure may also cause fluids to migrate through the cement sheath in the annulus to the surface, where the fluids may be released to the environment. These effects of increasing casing-casing annulus pressure are even more pronounced in wells for hydrocarbon gases.

SUMMARY

Accordingly, there is a need for annulus sealing compositions that are more resistant to formation of micro-cracks caused by thermal and pressure cycling of the wellbore. There is also a need for sealing compositions that can be used to remediate existing wellbore installations that have developed micro-cracks and casing-casing annulus pressure increases.

This need is met by the present sealing composition embodiments, in which the sealing composition includes an epoxy resin system comprising at least one epoxy resin and at least one curing agent. Once cured, the sealing composition comprising the epoxy resin system may form a barrier to prevent fluids, such as gases, liquids, or both, from penetrating through the annulus. The sealing composition may exhibit greater compressive strength, reduced density, and greater elasticity compared to conventional cement compositions, which may enable the sealing composition to resist degradation, such as formation of micro-cracks, caused by temperature and pressure cycling during production. The sealing composition may, therefore, prevent penetration of fluids from the hydrocarbon-bearing formation through the sealing composition and migration of these fluids to the surface or through the wellbore annulus or casing-casing annulus. The sealing compositions may be more resistive to corrosive fluids than conventional cements. The sealing compositions that include the epoxy resin system can withstand greater pressures than conventional cement, which may improve the zonal isolation and mitigate gas migration through the sealing composition. For example, the sealing compositions that include the epoxy resin system can withstand pressures in a range of from 7,000 pounds per square inch (psi) to 15,000 psi that are greater than conventional cement compositions, which can only withstand pressures in a range of from 500 psi to 5,000 psi. This ability of the sealing compositions with the epoxy resin system to withstand greater pressures may enable the sealing compositions to be injected deeper into high-pressure formations compared to conventional cement compositions. Also, the epoxy resin system may be substantially free of solids, which may make the sealing compositions that include the epoxy resin system attractive in low-injectivity zones where conventional cement cannot be used. The sealing compositions having the epoxy resin system can be used for primary sealing as well as in remedial operations to provide effective zonal isolation or to repair casing-casing annular leaks due to their ability to withstand increased differential pressure.

According to some embodiments, a composition for sealing an annulus of a wellbore may include from 20 weight percent to 97 weight percent epoxy resin based on the total weight of the composition, the epoxy resin comprising at least one of 2,3-epoxypropyl o-tolyl ether, alkyl glycidyl ethers having from 12 to 14 carbon atoms, or a compound having formula (I):

$$(OC_2H_3)-CH_2-O-R^1-O-CH_2-(C_2H_3O) \tag{I}$$

where $R^1$ is a linear or branched hydrocarbyl having from 4 to 24 carbon atoms. The composition may also include from 1 weight percent to 20 weight percent curing agent based on the total weight of the composition.

According to other embodiments, a composition for sealing an annulus of a wellbore may include from 20 weight percent to 97 weight percent epoxy resin based on the total weight of the composition, the epoxy resin comprising bisphenol-A-epichlorohydrin epoxy resin and a reactive diluent having formula $R^2-O-CH_2-(C_2H_3O)$, where $R^2$ is hydrocarbyl having from 12 to 14 carbon atoms. The composition may also include from 1 weight percent to 20 weight percent curing agent based on the total weight of the composition.

According to still other embodiments, a method for sealing an annulus of a wellbore may include introducing a spacer fluid into a tubular string positioned in the wellbore, the spacer fluid displacing at least a portion of a drilling fluid disposed in the wellbore and introducing a sealing composition into the tubular string positioned in the wellbore to displace at least a portion of the spacer fluid. The sealing composition may include from 20 weight percent to 97 weight percent epoxy resin based on the total weight of the sealing composition, the epoxy resin comprising at least one of alkyl glycidyl ethers having from 12 to 14 carbon atoms, 2,3-epoxypropyl o-tolyl ether, a bisphenol-A-epichlorohydrin epoxy resin, or a compound having formula (I):

$$(OC_2H_3)-CH_2-O-R^1-O-CH_2-(C_2H_3O) \tag{I}$$

where $R^1$ is a hydrocarbyl having from 4 to 24 carbon atoms, where the epoxy resin has an epoxy equivalent weight of from 170 to 350 epoxy equivalents per gram. The sealing composition may also include from 1 weight percent to 20 weight percent curing agent based on the total weight of the sealing composition. The method may further include introducing a displacement fluid into the wellbore to transfer the sealing composition into an annulus of the well and curing the sealing composition.

In still other embodiments, a method for repairing a weak zone in a hydrocarbon production well may include perforating at least one tubular string in the weak zone of the hydrocarbon production well and injecting a sealing composition through the tubular string and into the weak zone of the hydrocarbon production well. The sealing composition may include from 20 weight percent to 97 weight percent epoxy resin based on the total weight of the sealing composition, the epoxy resin comprising at least one of alkyl glycidyl ethers having from 12 to 14 carbon atoms, 2,3-epoxypropyl o-tolyl ether, a bisphenol-A-epichlorohydrin epoxy resin, or a compound having formula (I):

$$(OC_2H_3)-CH_2-O-R^1-O-CH_2-(C_2H_3O) \tag{I}$$

where $R^1$ is a hydrocarbyl having from 4 to 24 carbon atoms, where the epoxy resin has an epoxy equivalent weight of from 170 to 350 epoxy equivalents per gram. The sealing composition may also include from 1 weight percent to 20 weight percent curing agent based on the total weight of the sealing composition. The method may further include curing the sealing composition.

Additional features and advantages of the described embodiments will be set forth in the detailed description which follows, and in part will be readily apparent to those skilled in the art from that description or recognized by practicing the described embodiments, including the detailed description which follows as well as the claims.

DETAILED DESCRIPTION

As used throughout this disclosure, the term "hydrocarbon-bearing formation" refers to a subterranean geologic region containing hydrocarbons, such as crude oil, hydrocarbon gases, or both, which may be extracted from the subterranean geologic region.

As used throughout this disclosure, the term "fluid" may include liquids, gases, or both. As used throughout the disclosure, "spacer fluid" refers to a fluid utilized to space apart any two other materials utilized in well production.

Embodiments of the present disclosure are directed to sealing compositions and methods of sealing the casing-casing annulus in a wellbore using the sealing compositions. The sealing composition includes an epoxy system comprising an epoxy resin and a curing agent. In one embodiment, the sealing composition includes from 20 weight percent (wt. %) to 97 wt. % epoxy resin and from 1 wt. % to 20 wt. % curing agent. The sealing composition may be introduced to the annulus of the wellbore and cured to seal the annulus between the outer casing and the wellbore wall or any of the casing-to-casing annuli. The sealing composition may also be introduced to a portion of the wellbore experiencing casing-casing annulus pressure increase or damage caused by annulus pressure to remediate the portion of the wellbore.

Other embodiments of the present disclosure are directed to lost circulation material (LCM) compositions and methods of remediating lost circulation zones using the LCM compositions. The LCM compositions include the prior described epoxy system comprising the epoxy resin and curing agent. The LCM compositions may include from 50 weight percent (wt. %) to 97 wt. % epoxy resin and from 2 wt. % to 30 wt. % curing agent. The LCM composition may be introduced to a lost circulation zone to isolate the lost circulation zone from the wellbore.

Once cured, the sealing compositions and LCM compositions act as a barrier to prevent fluids, such as liquids and gases, from migrating through the sealing composition or LCM composition to the surface or into the production pipe of the well. Additionally, once cured, the sealing compositions and LCM compositions act as a barrier to prevent fluids, such as drilling fluids, sealing compositions, or both, from flowing from the wellbore into the subterranean formation and being lost. Once cured, the epoxy resin system of the sealing composition and LCM composition may exhibit greater compressive strength, lesser density, and greater elasticity compared to conventional cement compositions used for sealing the annuli of a wellbore or isolating lost circulation zones. For example, adding an amount of the epoxy resin system to a conventional cement composition may increase a compressive strength of the composition by at least 35% compared to the cement composition without the epoxy resin system. Regarding elasticity, in some embodiments, a sealing composition of the present disclosure may have a static bulk modulus of $1.184 \times 10^6$ pounds per square inch (psi) which is less than the static bulk modulus of $1.404 \times 10^6$ psi for a conventional hematite slurry (i.e., conventional cement composition). The static bulk modulus of a sealing composition is an elastic constant equal to the change in applied pressure divided by the ratio of the change in volume to the original volume of a body. A lesser static bulk modulus indicates greater elasticity.

These mechanical properties of the sealing composition and LCM composition may make the sealing composition and LCM composition less brittle and provide a greater deformation capacity compared to conventional cement compositions. In addition, the sealing compositions that include the epoxy resin system, prior to curing, may have beneficial rheological properties to enable the sealing composition to transmit hydrostatic pressure to the formation during the primary sealing process to support the wellbore walls and prevent fluid flow from the subterranean hydrocarbon-bearing formation into the wellbore. The sealing composition incorporating the epoxy resin system can be used in remedial operations to provide effective zonal isolation and to repair casing-casing annular leaks. As discussed subsequently in this disclosure, the sealing compositions and LCM compositions can be prepared with different density, viscosity, and mechanical properties by changing the concentration of the epoxy resin or curing agent. For example, the sealing composition or LCM composition can be designed to produce a final cured epoxy that is rigid or flexible, as needed. Thus, the epoxy resin system may be adapted for use in different downhole conditions of the wellbore.

Also, in some embodiments, the sealing compositions or LCM compositions that include the epoxy resin system may be substantially free of solids, which may make the sealing compositions and LCM compositions suitable for low-injectivity zones, for which conventional cement compositions cannot be used. The sealing compositions and LCM compositions with the epoxy resin system may have reduced density compared to conventional cement compositions, which makes the sealing composition more suitable for narrow fracture pressure gradient zones compared to the conventional cement compositions.

The wellbore forms a pathway capable of permitting both fluid and apparatus to traverse between the surface and the hydrocarbon-bearing formation. Besides defining the void volume of the wellbore, the wellbore wall also acts as the interface through which fluid can transition between the formations through which the wellbore traverses and the interior of the well bore. The wellbore wall can be unlined (that is, bare rock or formation) to permit such interaction with the formation or lined (that is, with a tubular string as previously described in this disclosure) so as to not permit such interactions.

The wellbore contains at least a portion of a fluid conduit that links the interior of the wellbore to the surface. The fluid conduit connecting the interior of the wellbore to the surface may be capable of permitting regulated fluid flow from the interior of the wellbore to the surface and may permit access between equipment on the surface and the interior of the wellbore. Example equipment connected at the surface to the fluid conduit includes pipelines, tanks, pumps, compressors and flares. The fluid conduit may be large enough to permit introduction and removal of mechanical devices, including but not limited to tools, drill strings, sensors and instruments, into and out of the interior of the well bore.

As previously described, the fluid conduit may be defined by a tubular string installed in the wellbore. The wellbore annulus has a volume defined between the external surface of the tubular string and the wellbore wall. As wellbore drilling continues and the wellbore extends deeper into the subterranean formation, one or more additional tubular strings may be installed within the fluid conduit defined by the initial tubular string. Additional tubular strings may have outer cross-sectional dimensions that are less than the inner cross-sectional dimensions of the tubular strings within which the additional tubular strings are disposed. Thus, the additional tubular string, when installed in the wellbore, may form a casing-casing annulus defined between the exterior surface of the additional tubular string and the interior surface of the tubular string surrounding the additional tubular string. Therefore, after drilling is complete and the wellbore is fitted with production tubing for production, the wellbore may comprise a plurality of tubular strings of progressively smaller cross-sectional dimensions that form a wellbore annulus and a plurality of casing-casing annuli.

As previously described in this disclosure, installing each tubular string includes positioning the tubular string in the wellbore and primary sealing the tubular string in the wellbore. The primary sealing process includes placing a sealing composition in the annulus and curing the sealing composition to seal the annulus. Before primary sealing can be performed, the wellbore may be drilled using a drill string in the presence of a drilling fluid. At the conclusion of drilling, the wellbore is filled with drilling fluid. The drilling fluid is left in the wellbore, and the tubular string is positioned in the wellbore. When the tubular string is positioned in the wellbore, the drilling fluid may fill the interior volume of the tubular string as well as the annulus between the exterior surface of the tubular string and the wellbore wall. For interior tubular strings, the tubular string may form a wellbore annulus between the exterior surface and the wellbore wall along part of the length of the tubular string and a casing-casing annulus between the exterior surface and an interior surface of the previously installed casing along an uphole part of the length of the tubular string.

In some circumstances, the sealing composition may be incompatible with the drilling fluid. Therefore, to commence primary sealing, a spacer fluid may first be pumped into the interior volume of the tubular string to displace the drilling fluid and provide a buffer between the drilling fluid and the sealing composition. Various washing fluids or preflush fluids may also be introduced to the interior volume of the tubular string before or after the spacer fluid. Washing fluids may be used to remove films and residue from the surfaces of the tubular string and wellbore wall. A fixed amount of the sealing composition may then be pumped into the internal volume of the tubular string after the spacer fluid. The fixed amount of the sealing composition may be an amount that fills the annulus, such as the wellbore annulus, casing-casing annulus, or both. A downhole plug may be used between the spacer fluid and sealing composition, and an uphole plug may be inserted after the sealing composition.

A displacement fluid may be pumped into the interior volume of the tubular string after the uphole plug to force the sealing composition to the downhole end of the tubular string, around the downhole edge of the tubular string, and into the annulus. A displacement fluid may also be referred to as a flush fluid. The displacement fluid is pumped into the interior volume of the tubular string until all of the sealing composition is disposed within the annulus. Cooperation of the downhole plug and uphole plug may operate to maintain the sealing composition in the annulus.

The sealing composition may then be allowed to cure to form a sealing barrier between the tubular string and the wellbore wall, between the tubular string and an outer tubular string, or both. When the sealing composition cures, the sealing composition physically and chemically bonds with both the exterior surface of the tubular string and the wellbore wall or interior surface of the outer casing surrounding the tubular string, coupling the tubular string to the wellbore wall or the outer casing. This fluid isolation does not permit fluid migration through the sealing composition to the interior of the well or uphole to the surface.

In addition to primary sealing, remedial sealing may be performed using the sealing compositions. In remedial sealing, the sealing composition is introduced to specific locations within the wellbore to repair the wellbore, such as to repair sections of the wellbore in which micro-cracks have formed in the annuli or in which increased casing-casing annulus pressure has caused damage to the tubular strings. Remedial sealing may also include injecting the sealing composition into the wellbore for purposes of sealing the wellbore in preparation for abandonment. In some situations, remedial sealing may include the process of "squeezing," in which the sealing composition is forced against the inner surface of the portion of the well to be remediated, such as the inner surface of the innermost tubular string. As the sealing composition is forced against the inner surface of the tubular string or wellbore wall, liquid portions of the sealing composition may be "squeezed" into the microcracks, or into the formation in the case of remediating the wellbore wall. For conventional sealing compositions, the solids may form a layer on the inner surface of the tubular string.

While drilling the wellbore, the drilling operation may encounter a lost circulation zone. In a lost circulation zone, drilling fluid, sealing compositions, or both flow from the wellbore into the subterranean formation, resulting in loss of the drilling fluid or sealing composition from the drilling process. In some instances, lost circulation may be caused by the natural state of the formation through which the drilling passes. For example, the subterranean formation may be naturally fractured or may be an unconsolidated formation, such as gravel, sand, pea, or other unconsolidated material. Alternatively, in other situations, the hydrostatic pressure of the drilling fluid or sealing composition may be greater than the fracture gradient of the subterranean formation, which may cause the at least some breakdown of the pores in the formation. If the pores in the formation breakdown enough, then the pores become big enough to receive the fluids from the wellbore rather than resisting flow of these fluids.

Lost circulation zones may be remediated by introducing a material into the formation in the lost circulation zone to seal the lost circulation zone from the wellbore. The material may be injected into the formation or squeezed into the formation. Conventional lost circulation materials (LCM) can include bridging material, fibrous material, flaky material, cement such as low-cure-time cement, and other materials having different particle sizes. Specific examples of conventional lost circulation materials may include calcium carbonate, cements, paper, cottonseed hulls, nutshells, or other similar materials. These materials may be effective at mediating many lost circulation zones by forming a layer of solids over the formation at the lost circulation zone. However, these materials are not effective for use as LCM in low-injectivity zones, because the solids content of these conventional materials prevents these materials from being injected into the formation.

Low-injectivity zones are zones in which it is not possible to inject materials containing solid particles. Low-injectivity zones may include zones having an injectivity factor of greater than 4000 pounds of force per square inch—min per barrel (psi-min/bbl), or even greater than 6000 psi-min/bbl. As used herein, the term "barrel" refers to a unit of measure equal to 42 U.S. Gallons. The injectivity factor is defined as the quotient of the injection pressure in pounds of force per square inch (psi) divided by the injection rate in barrels per minute (bbl/min). These low-injectivity zones may include, but are not limited to, tight fractures comprising very narrow microcracks from the wellbore into the subterranean formation and areas in which the annular distance between casings is tight. In low-injectivity zones, the average width of the microcracks in the formation or the annular distance between casings may be less than 100 microns, such as less than 50 microns, or even less than 10 microns. In these low-injectivity zones, solids particles in the cement composition or other material compositions may cause blockage and prevent cement or other compositions from being injected into the zone. For example, cement compositions and other conventional materials for remediating lost circulation zones include greater concentrations of solids and are not generally injectable into low-injectivity zones. Low-injectivity zones require the use of materials that are substantially free of solids or solid particles. As used in this disclosure, the term "substantially free" of a constituent means less than 1 weight percent (wt. %) of that component in a particular portion of a composition, such as a drilling fluid, sealing composition, lost circulation material, spacer fluid, cleaning fluid, or other material. As an example, a lost circulation material that is substantially free of solids may have less than 1 wt. % solids based on the total weight of the lost circulation material.

As previously discussed in this disclosure, the sealing composition and LCM compositions of this disclosure may include an epoxy resin system that includes at least one epoxy resin and at least one curing agent. The epoxy resin may include bisphenol-A-based epoxy resins, bisphenol-F-based epoxy resins, aliphatic epoxy resins, Novalac resins, or combinations of these epoxy resins. Aliphatic epoxy resins may have formula (I):

$$(OC_2H_3)-CH_2-O-R^1-O-CH_2-(C_2H_3O) \quad (I)$$

where $R^1$ may be a linear or branched hydrocarbyl having from 4 to 24 carbon atoms, such as from 4 to 20, from 4 to 16, from 4 to 12, from 4 to 8, from 6 to 24, from 6 to 20, from 6 to 16, or from 6 to 12 carbon atoms. In some embodiments, $R^1$ may be an alkyl group. For example, in one embodiment, the epoxy resin may include 1,6-hexanediol diglycidyl ether, which has formula (II):

$$(OC_2H_3)-CH_2-O-C_6H_{12}-O-CH_2-(C_2H_3O) \quad (II)$$

In some embodiments, the epoxy resin may include at least one of 1,6-hexanediol diclycidyl ether, alkyl glycidyl ethers having from 12 to 14 carbon atoms, 2,3-epoxypropyl o-tolyl ether, or bisphenol-A-epichlorohydrin epoxy resin.

Alternatively, in other embodiments, the epoxy resin may include at least one of 1,6-hexanediol diclycidyl ether, alkyl glycidyl ethers having from 12 to 14 carbon atoms, or 2,3-epoxypropyl o-tolyl ether.

The epoxy resin may have an epoxy value of from 4.5 epoxy equivalents per kilogram of the epoxy resin to 5.5 epoxy equivalents per kilogram of the epoxy resin. The epoxy equivalent weight of an epoxy resin is the weight of the epoxy resin in grams that contains one equivalent weight of epoxy. The epoxy equivalent weight of the epoxy resin is equal to the molecular weight of the epoxy resin divided by the average number of epoxy groups in the epoxy resin. The epoxy resins may have an epoxy equivalent weight of from 170 to 350 grams of resin per epoxy equivalent (g/eq). The epoxy value and epoxy equivalent weight of an epoxy resin may be determined according to ASTM-D1652. Other methods of determining the epoxy value and epoxy equivalent weight of the epoxy resin may also be used to determine the epoxy value or epoxy equivalent weight of the epoxy resin.

When used for a sealing composition, in some embodiments, the epoxy resin may have a viscosity that enables the sealing composition to be transferred into the annulus between the exterior surface of the tubular string and the wellbore wall or the interior surface of a casing surrounding the tubular string. In other embodiments, the epoxy resin may have a viscosity that enables introduction of the sealing composition having the epoxy resin into a remediation area. When the epoxy resin system is included in the LCM composition, in some embodiments, the epoxy resin may have a viscosity that enables injection of the LCM composition into a subterranean formation, such as a low-injectivity zone of a subterranean formation. In some embodiments, the epoxy resin may have a viscosity of from 200 millipascal seconds (mPa·s) to 50,000 mPa·s, from 200 mPa·s to 20,000 mPa·s, from 200 mPa·s to 15,000 mPa·s, from 200 mPa·s to 10,000 mPa·s, from 200 mPa·s to 5,000 mPa·s, from 200 mPa·s to 2,000 mPa·s, from 500 mPa·s to 50,000 mPa·s, from 500 mPa·s to 20,000 mPa·s, from 500 mPa·s to 15,000 mPa·s, from 500 mPa·s to 10,000 mPa·s, from 500 mPa·s to 5,000 mPa·s, from 500 mPa·s to 2,000 mPa·s, from 1000 mPa·s to 50,000 mPa·s, from 1000 mPa·S to 20,000 mPa·s, from 1000 mPa·s to 15,000 mPa·s, from 1000 mPa·s to 10,000 mPa·s, from 1000 mPa·s to 5,000 mPa·s, or from 1000 mPa·s to 2,000 mPa·s.

In some embodiments, the epoxy resin may be modified with a reactive diluent. The type and amount of reactive diluent may influence the viscosity, flexibility, hardness, chemical resistance, mechanical properties, plasticizing effect, reactivity, crosslinking density, or other properties of the epoxy resin. In some embodiments, the reactive diluent may be added to the epoxy resin to change the viscosity of the epoxy resin, such as to reduce the viscosity of the epoxy resin. In other embodiments, the reactive diluents may be added to improve at least one of the adhesion, the flexibility, and the solvent resistance of the epoxy resin. The reactive diluent can be a non-functional, mono-functional, di-functional, or multi-functional reactive diluent. For example, a non-functional reactive diluent does not have an epoxide functional group. As used in relation to reactive diluents, the term "functional" refers to the reactive diluent having at least one epoxide functional group. Therefore, a functional reactive diluent may have one, two, three, or more than three epoxide functional groups. The term "non-functional", as used in relation to reactive diluents, refers to a reactive diluent that does not have at least one epoxide functional group. Thus, a non-functional reactive diluent does not have at least one epoxide functional group, but still participates in at least one chemical reaction during reaction of the epoxide resin. The term "non-reactive diluent" refers to a diluent that does not participate in a chemical reaction during reaction of the epoxy resin. Examples of reactive and non-reactive diluents may include, but are not limited to, propylene glycol diglycidyl ether, butanediol diglycidyl ether, cardanol glycidyl ether derivatives, propanetriol triglycidyl ether, aliphatic monoglycidyl ethers of $C_{13}$-$C_{15}$ alcohols, or combinations of functional or non-functional reactive diluents and non-reactive diluents. In some embodiments, the epoxy resin may include a reactive diluent having the formula (III):

$$R^2\text{—O—}CH_2\text{—}(C_2H_3O) \qquad (III)$$

where $R^2$ is a hydrocarbyl having from 12 to 14 carbon atoms. $R^2$ may be linear, branched, or cyclic. In some embodiments, $R^2$ may be an alkyl group.

In some embodiments, the epoxy resin may include an amount of reactive diluent that reduces the viscosity of the epoxy resin. In other embodiments, the epoxy resin may include an amount of reactive diluent that modifies one or more of the adhesion, the flexibility, or the solvent resistance of the epoxy resin. In some embodiments, the epoxy resin may include from 1 wt. % to 30 wt. % reactive diluent based on the total weight of the epoxy resin portion of the epoxy resin system. As used in this disclosure, the term "epoxy resin portion" refers to the constituents of the epoxy resin system that do not include the curing agent, weighting agents, or other additives, such as accelerators or retarders. The epoxy resin portion includes the epoxy resins and any added reactive or non-reactive diluent. In other embodiments, the epoxy resin may include from 1 wt. % to 20 wt. %, from 1 wt. % to 16 wt. %, from 1 wt. % to 14 wt. %, from 1 wt. % to 12 wt. %, from 5 wt. % to 30 wt. %, from 5 wt. % to 20 wt. %, from 5 wt. % to 16 wt. %, from 5 wt. % to 14 wt. %, from 5 wt. % to 12 wt. %, from 10 wt. % to 30 wt. %, from 10 wt. % to 20 wt. %, from 10 wt. % to 16 wt. %, from 10 wt. % to 14 wt. %, from 12 wt. % to 30 wt. %, from 12 wt. % to 20 wt. %, from 12 wt. % to 16 wt. %, from 14 wt. % to 30 wt. %, from 14 wt. % to 20 wt. %, or from 14 wt. % to 16 wt. % reactive diluent based on the total weight of the epoxy resin portion of the epoxy system.

In some embodiments, the epoxy resin may include bisphenol-A-(epichlorohydrin) epoxy resin with oxirane mono [($C_{12}$-$C_{14}$)-alkyloxy)methyl] derivatives. The bisphenol-A-epichlorohydrin epoxy resin is an epoxy resin made by reaction of bisphenol-A and epichlorohydrin. The bisphenol-A-(epichlorohydrin) epoxy resin may then be modified with the reactive diluent oxirane mono [($C_{12}$-$C_{14}$)-alkyloxy) methyl] derivatives to reduce the viscosity of the resin and improve the adhesion, flexibility, and solvent resistance of the final resin. The bisphenol-A-(epichlorohydrin) epoxy resin with the reactive diluent oxirane mono [($C_{12}$-$C_{14}$)-alkyloxy) methyl] derivatives may modify the viscosity of the sealing compositions or LCM compositions, or may provide the sealing composition or the LCM composition with a non-crystalizing resin and improved mechanical and chemical resistance compared to compositions without the bisphenol-A-(epichlorohydrin) epoxy resin with the reactive diluent oxirane mono [($C_{12}$-$C_{14}$)-alkyloxy) methyl] derivatives. In some embodiments, the epoxy resin may include from 80 wt. % to 90 wt. %, from 80 wt. % to 88 wt. %, from 80 wt. % to 86 wt. %, from 80 wt. % to 84 wt. %, from 82 wt. % to 90 wt. %, from 82 wt. % to 88 wt. %, from 82 wt. % to 86 wt. %, from 82 wt. % to 84 wt. %, from 84 wt. % to 90 wt. %, from 84 wt. % to 88 wt. %, or from 84 wt. % to 86 wt. % of the bisphenyl-A-epichlorohydrin epoxy resin based on the total weight of the epoxy resin. In some embodiments, the epoxy resin may include from 10 wt. % to 20 wt. %, from 10 wt. % to 18 wt. %, from 10 wt. % to 16 wt. %, from 10 wt. % to 14 wt. %, from 12 wt. % to 20 wt. %, from 12 wt. % to 18 wt. %, from 12 wt. % to 16 wt. %, from 12 wt. % to 14 wt. %, from 14 wt. % to 20 wt. %, from 14 wt. % to 18 wt. %, or from 14 wt. % to 16 wt. % oxirane mono[($C_{12}$-$C_{14}$)-alkyloxy)methyl]derivatives based on the total weight of the epoxy resin portion of the epoxy resin system.

In some embodiments, the epoxy resin comprising the bisphenol-A-(epichlorohydrin) epoxy resin with the reactive diluent oxirane mono [($C_{12}$-$C_{14}$)-alkyloxy) methyl] derivatives may have an epoxy value of from 4.76 epoxy equivalents per kilogram of epoxy resin to 5.26 epoxy equivalents per kilogram of epoxy resin. The epoxy resin comprising the bisphenol-A-(epichlorohydrin) epoxy resin with the reactive diluent oxirane mono [($C_{12}$-$C_{14}$)-alkyloxy) methyl] derivatives may have an epoxy equivalent weight of 190 g/eq to 210 g/eq and a dynamic viscosity of from 600 millipascal seconds (mPa·s) to 1200 mPa·s, or 600 mPa·s to 900 mPa·s.

In some embodiments, the epoxy resin may include 2,3-epoxypropyl-o-tolyl ether, which may have an epoxy equivalent weight of from 170 g/eq to 190 g/eq and exhibit a dynamic viscosity of from 7 mPa·s to 10 mPa·s. In other embodiments, the epoxy resin may include alkyl glycidyl ethers having from 12 to 14 carbon atoms, which may have an epoxy equivalent weight of from 270 g/eq to 305 g/eq and may exhibit a dynamic viscosity of from 5 mPa·s to 12 mPa·s. In some embodiments, the epoxy resin may include 1,6-hexanediol diclycidyl ether, which may have an epoxy equivalent weight of from 150 g/eq to 170 g/eq and may exhibit a dynamic viscosity of from 20 mPa·s to 30 mPa·s.

In some embodiments, the epoxy resin system may include a plurality of epoxy resins. For example, in some embodiments, the epoxy resin system may include a combination of two or more of bisphenol-A-epichlorohydrin epoxy resin, 2,3-epoxypropyl-o-tolyl ether, $C_{12}$-$C_{14}$ alkyl glycidyl ether, or 1,6-hexanediol diglycidyl ether epoxy resin. In one embodiment, the epoxy resin may include a mixture of 1,6-hexanediol diglycidyl ether epoxy resin and bisphenol-A-epichlorohydrin epoxy resin with the reactive diluent oxirane mono [($C_{12}$-$C_{14}$)-alkyloxy)methyl]derivatives.

In some embodiments, the sealing composition may include an amount of the epoxy resin necessary to form a cured epoxy composition. For example, in some embodiments, the sealing composition may include from 20 wt. % to 99 wt. % epoxy resin based on the total weight of the sealing composition before curing. In other embodiments, the sealing composition may include from 20 wt. % to 97 wt. %, from 20 wt. % to 95 wt. %, from 20 wt. % to 90 wt. %, from 20 wt. % to 80 wt. %, from 20 wt. % to 60 wt. %, from 40 wt. % to 99 wt. %, from 40 wt. % to 97 wt. %, from 40 wt. % to 95 wt. %, from 40 wt. % to 90 wt. %, from 40 wt. % to 80 wt. %, from 40 wt. % to 60 wt. %, from 60 wt. % to 99 wt. %, from 60 wt. % to 97 wt. %, from 60 wt. % to 95 wt. %, from 60 wt. % to 90 wt. %, from 60 wt. % to 80 wt. %, from 80 wt. % to 99 wt. %, from 80 wt. % to 97 wt. %, from 80 wt. % to 95 wt. %, from 80 wt. % to 90 wt. %, from 90 wt. % to 99 wt. %, from 90 wt. % to 97 wt. %, or from 90 wt. % to 95 wt. % epoxy resin based on the total weight of the sealing composition before curing.

As previously discussed in this disclosure, the epoxy resin system includes a curing agent to cure the epoxy resin. The curing agent may include at least one of an amine, polyamine, amine adduct, polyamine adduct, alkanolamine, amide, polyamide, polyamide adduct, polyamide imidazoline, polyaminoamides, phenalkamine, or combinations of these. Amines or polyamine curing agents may include, but are not limited to, aliphatic amines, cycloaliphatic amines, modified cycloaliphatic amines such as cycloaliphatic amines modified by polyacrylic acid, aliphatic polyamines, cycloaliphatic polyamines, modified polyamines such as polyamines modified by polyacrylic acid, or amine adducts such as cycloaliphatic amine adducts or polyamine adducts.

In some embodiments, the curing agent may include at least one of trimethyl hexamethylene diamine (TMD), diethylenetriamine (DETA), triethylenetetramine (TETA), meta-xylenediamine (MXDA), aminoethylpiperazine (AEP), tetraethylenepentamine (TEPA), polyetheramine, isophoronediamine (IPDA), beta-hydroxyalkyl amide (HAA), or combinations of these. In other embodiments, the curing agent may include at least one of DETA, TETA, TEPA, IPDA, or combinations of these. In some embodiments, the epoxy resin system may include a plurality of curing agents.

The curing agent may be an amine curing agent having an amine value that enables the amine curing agent to fully cure the epoxy resin system. The amine value of a curing agent gives the active hydrogen (NH) content of an amine curing agent. The amine value is expressed as the weight in milligrams of potassium hydroxide (KOH) needed to neutralize the NH in 1 gram of the amine curing agent. In some embodiments, the curing agent may have an amine value of from 250 milligrams of KOH per gram (mg KOH/g) to 1700 mg KOH/g, from 250 mg KOH/g to 1650 mg KOH/g, from 250 mg KOH/g to 1600 mg KOH/g, from 450 mg KOH/g to 1700 mg KOH/g, from 450 mg KOH/g to 1650 mg KOH/g, from 450 mg KOH/g to 1600 mg KOH/g, from 650 mg KOH/g to 1700 mg KOH/g, from 650 mg KOH/g to 1650 mg KOH/g, or from 650 mg KOH/g to 1600 mg KOH/g. The amine value may be determined by titrating a solution of the curing agent with a dilute acid, such as a 1 N solution of hydrogen chloride (HCl). The amine value may then be calculated from the amount of HCl needed to neutralize the amine in the solution according to Equation 1 (EQU. 1):

$$\frac{V_{HCl} * N_{HCl} * MW_{KOH}}{W} \qquad \text{EQU. 1}$$

where $V_{HCl}$ is the volume in milliliters of HCl needed to neutralize the amine, $N_{HCl}$ is the normality of HCl used to titrate the amine, $MW_{KOH}$ is the molecular weight of KOH in grams per mole, and W is the weight in grams of the curing agent sample titrated. The amine number of the known pure amine curing agent may be calculated from Equation 2 (EQU. 2):

$$\frac{1000 * MW_{KOH}}{MW_{curing\ agent}} \qquad \text{EQU. 2}$$

where $MW_{KOH}$ is the molecular weight of KOH in grams per mole, and $MW_{curing\ agent}$ is the molecular weight of the curing agent in grams per mole.

The amine curing agent may have an amine hydrogen equivalent weight (AHEW) that enables the amine curing agent to fully cure the epoxy resin system. The AHEW of an amine curing agent refers to the grams of the amine curing agent containing 1 equivalent of amine. The AHEW of an amine curing agent may be calculated by dividing the molecular weight of the amine curing agent in grams per mole by the number of active hydrogens per molecule. In some embodiments, the curing agent may be an amine curing agent having an AHEW of from 20 grams (g) to 120 g, from 20 g to 115 g, from 20 g to 110 g, from 20 g to 100 g, from 40 g to 120 g, from 40 g to 115 g, from 40 g to 110 g, from 40 g to 110 g, from 60 g to 120 g, from 60 g to 115 g, or from 60 g to 110 g determined according to the methods previously described in this disclosure.

The curing time of the sealing composition may be inversely proportional to the amount of curing agent in the sealing composition. For example, increasing the amount of the curing agent in the sealing composition may result in a decrease in the curing time of the sealing composition. In some embodiments, the sealing composition may include an amount of curing agent capable of curing the epoxy resin in the sealing composition to a semi-solid state in a cure time of from 4 hours to 12 hours. As used in this disclosure, the term "semi-solid" refers to a state of the compositions that is between a liquid and a solid in which the composition exhibits high elasticity and flexibility. In the semi-solid state, the sealing composition may be easily deformed but may return to shape upon releasing the deforming force. The sealing compositions cured to a semi-solid or solid state are capable of sealing the annulus of the wellbore.

In some embodiments, the sealing composition may include an amount of the curing agent capable of curing the epoxy resin system to a semi-solid state within a cure time of from 4 hours to 9 hours. In some embodiments, the sealing composition may include from 0.1 wt. % to 20 wt. % curing agent based on the total weight of the sealing composition before curing. In other embodiments, the sealing composition may have from 0.1 wt. % to 15 wt. %, from 0.1 wt. % to 10 wt. %, from 0.1 wt. % to 5 wt. %, from 0.5 wt. % to 20 wt. %, from 0.5 wt. % to 15 wt. %, from 0.5 wt. % to 10 wt. %, from 0.5 wt. % to 5 wt. %, from 1 wt. % to 20 wt. %, from 1 wt. % to 15 wt. %, from 1 wt. % to 10 wt. %, from 1 wt. % to 5 wt. %, from 5 wt. % to 20 wt. %, from 5 wt. % to 15 wt. %, from 5 wt. % to 10 wt. %, or from 10 wt. % to 20 wt. % curing agent based on the total weight of the sealing composition before curing.

The epoxy resin system may also include one or more additives to modify the speed of the reaction between the epoxy resin and the curing agent or modify other properties of the resin system, such as viscosity, yield point, or other rheological properties. For example, in some embodiments, the epoxy resin system may include an accelerator or a retarder to speed up or slow down the reaction between the epoxy resin and the curing agent. Accelerators may include, but are not limited to, alcohols, phenols, aminoalcohols, or amines. Examples of accelerators may include, but are not limited to benzyl alcohol, mono-nonylphenol, triethanolamine (TEA), amino-n-propyl diethanolamine, n,n-dimethyldipropylenetramine, or combinations of these. Examples of retarders may include lignin, gums, starches, lignosulphonate derivatives, or combinations of these.

In some embodiments, the sealing composition may include an amount of the accelerator capable of decreasing the cure time of the sealing composition from greater than 12 hours to a cure time in a range of from 1 hour to 12 hours. In some embodiments, the sealing composition may include from 0.01 wt. % to 10 wt. % accelerator based on the total weight of the sealing composition prior to curing. In other embodiments, the sealing composition may include from 0.01 wt. % to 5 wt. %, from 0.01 wt. % to 3 wt. %, from 0.01 wt. % to 1 wt. %, from 0.1 wt. % to 10 wt. %, from 0.1 wt. % to 5 wt. %, from 0.1 wt. % to 3 wt. %, from 0.1 wt. % to 1 wt. %, from 1 wt. % to 10 wt. %, from 1 wt. % to 5 wt. %, or from 1 wt. % to 3 wt. % accelerator based on the total weight of the sealing composition prior to curing.

The sealing compositions may include one or more weighting materials. The weighting materials may be particulate solids having a specific gravity (SG) that increases the density of the sealing composition. The weighting material may be added to the sealing composition to increase the density of the final cured resin to increase the hydrostatic pressure exerted by the sealing composition on the wellbore wall or the interior surface of the outer tubular string. The final density of the cured resin may depend on the geology of the subterranean formation in the zone being sealed. For example, in some embodiments, the subterranean formation may require a sealing composition with a greater density to support the wellbore and prevent flow of fluids from the subterranean formation into the wellbore during curing of the sealing composition.

The weighting material may have a specific gravity (SG) of from 2 to 6. Examples of weighting materials may include, but are not limited to, sand, barite (barium sulfate), hematite, calcium carbonate, siderite, ilmenite, silica sand, manganese oxide (MnO), hausmanite (manganese tetraoxide ($Mn_3O_4$)), zin oxide, zirconium oxide, iron oxide, fly ash, or any combination of these weighting materials. In some embodiments, sealing composition may include manganese tetraoxide.

The sealing composition may include an amount of weighting material that increases the density of the sealing composition. In some embodiments, the sealing composition may include from 0.1 wt. % to 40 wt. % weighting material based on the total weight of the sealing composition prior to curing. For example, in some embodiments, the sealing composition may include from 0.1 wt. % to 30 wt. %, from 0.1 wt. % to 20 wt. %, from 0.1 wt. % to 10 wt. %, from 1 wt. % to 40 wt. %, from 1 wt. % to 30 wt. %, from 1 wt. % to 20 wt. %, from 1 wt. % to 10 wt. %, from 5 wt. % to 40 wt. %, from 5 wt. % to 30 wt. %, from 5 wt. % to 20 wt. %, from 5 wt. % to 10 wt. %, from 10 wt. % to 40 wt. %, from 10 wt. % to 30 wt. %, from 10 wt. % to 20 wt. %, or from 20 wt. % to 40 wt. % weighting material based on the total weight of the sealing composition before curing.

In some embodiments, the epoxy resin system may include other modifiers, such as cardanol liquid, polyacrylate flow agents, or combinations of these. Modifiers may be added to the epoxy resin system to decrease the viscosity of the epoxy resin.

In some embodiments, the sealing composition may include from 20 wt. % to 97 wt. % epoxy resin based on the total weight of the composition, where the epoxy resin comprises at least one of 2,3-epoxypropyl o-tolyl ether, alkyl glycidyl ethers having from 12 to 14 carbon atoms, or the compound having formula (I):

$$(OC_2H_3)-CH_2-O-R^1-O-CH_2-(C_2H_3O) \qquad (I)$$

where $R^1$ is a linear or branched hydrocarbyl having from 4 to 24 carbon atoms, and from 1 weight percent to 20 weight percent curing agent based on the total weight of the composition. Alternatively, in other embodiments, the sealing composition may include from 20 wt. % to 97 wt. % bisphenol-A-epichlorohydrin epoxy resin with the reactive diluent oxirane mono [($C_{12}$-$C_{14}$)-alkyloxy)methyl] derivatives and 1 wt. % to 20 wt. % TEPA curing agent. In other embodiments, the sealing composition may include 10 wt. % to 80 wt. % bisphenol-A-epichlorohydrin epoxy resin with the reactive diluent oxirane mono [($C_{12}$-$C_{14}$)-alkyloxy)methyl] derivatives, 10 wt. % to 80 wt. % 1,6-hexanediol diglycidyl ether, 1 wt. % to 20 wt. % TEPA. In some embodiments, the sealing composition may include from 1 wt. % to 40 wt. % $Mn_3O_4$ weighting material.

The epoxy resins in the epoxy resin system are initially in liquid form. Upon combining the epoxy resins with the curing agents, the epoxy resins react with the curing agents to transform into a semi-solid or solid epoxy resin. Transition of epoxy resin from a liquid to a solid involves formation of covalent bonds via cross-linking reactions that initially build viscosity in the sealing compositions. Thus, during the curing process in which the epoxy resins transform from liquid to solid through cross-linking, the buildup of viscosity in the sealing compositions may enable the sealing compositions to continue to transmit hydrostatic pressure to the hydrocarbon-bearing formation. At a crossover point in the curing process, the epoxy resins may begin to form into a non-porous three-dimensional network. As this non-porous three-dimensional network begins to form, the epoxy resin continues to transmit hydrostatic pressure to the formation until an impermeable barrier of cured epoxy resin forms.

The sealing composition may have a cure time that enables the sealing composition to be transferred into the wellbore annulus, casing-casing annulus, remediation zone, or other region of the wellbore before the buildup of viscosity causes transfer problems, such as inability to pump the sealing composition. In some embodiments, the sealing composition may have a cure time of greater than or equal to 4 hours, greater than or equal to 5 hours, or greater than or equal to 6 hours. In some embodiments, the sealing composition may have a cure time of less than or equal to 12 hours, less than or equal to 10 hours, or even less than or equal to 9 hours. In some embodiments, the sealing composition may have a cure time of from 4 hours to 12 hours, from 4 hours to 10 hours, from 4 hours to 9 hours, from 4 hours to 6 hours, from 5 hours to 12 hours, from 5 hours to 10 hours, from 5 hours to 9 hours, from 6 hours to 12 hours, from 6 hours to 10 hours, from 6 hours to 9 hours, from 9 hours to 12 hours, or from 10 hours to 12 hours.

The sealing compositions can be used for sealing the annulus or remediating a wellbore under a range of different downhole conditions in the wellbore. For example, in some embodiments, the sealing composition may be adapted to different downhole conditions by changing the concentrations of the epoxy resin, curing agents, accelerators, or weighting materials in the sealing composition to modify the specific gravity, viscosity, mechanical properties, curing time, or other properties of the sealing compositions.

The sealing compositions may be capable of withstanding a wide range of temperatures and pressures without failing or deteriorating. Failure or deterioration of the sealing composition may allow liquids or gases to penetrate into or through the sealing composition. For example, the sealing compositions, once cured, may be capable of withstanding temperatures of from 20 degrees Celsius (° C.) to 205° C. The cured sealing compositions may also be able to withstand temperature cycling within a temperature range of from 20° C. to 205° C. The cured sealing composition may be capable of withstanding pressures of up to 4,000,000 pounds of force per square inch (psi) (1 psi equals 6.89476 kilopascals (kPa)). For example, in some embodiments, the cured sealing composition may be capable of withstanding pressures of from 14 psi to 4,000,000 psi without failing or deteriorating to allow liquids or gases to penetrate into or through the sealing composition.

The rheology and density of the sealing compositions can be adjusted over a wide range of values depending on the requirement for the well and the downhole conditions of the well. The sealing composition may have a density that enables the sealing composition to exert hydrostatic pressure on the wellbore wall or interior surface of an outer casing to support the wellbore, prevent fluids from flowing from the subterranean formation into the wellbore, or both. In some embodiments, the sealing composition may have a density of from 55 pounds per cubic foot ($lbm/ft^3$) to 170 $lbm/ft^3$ measured immediately after addition of the curing agent and before substantial curing has occurred. As used in this disclosure, the term "substantial curing" refers to an amount of curing that produces a change of greater than 5 percent (%) in any rheological property of the composition. In some embodiments, the sealing composition may have a density of from 55 $lbm/ft^3$ to 150 $lbm/ft^3$, from 55 $lbm/ft^3$ to 130 $lbm/ft^3$, from 55 $lbm/ft^3$ to 110 $lbm/ft^3$, from 55 $lbm/ft^3$ to 90 $lbm/ft^3$, from 60 $lbm/ft^3$ to 170 $lbm/ft^3$, from 60 $lbm/ft^3$ to 150 $lbm/ft^3$, from 60 $lbm/ft^3$ to 130 $lbm/ft^3$, from 60 $lbm/ft^3$ to 110 $lbm/ft^3$, from 60 $lbm/ft^3$ to 90 $lbm/ft^3$, from 80 $lbm/ft^3$ to 170 $lbm/ft^3$, from 80 $lbm/ft^3$ to 130 $lbm/ft^3$, from 80 $lbm/ft^3$ to 110 $lbm/ft^3$, from 90 $lbm/ft^3$ to 150 $lbm/ft^3$, or from 90 $lbm/ft^3$ to 130 $lbm/ft^3$. In some embodiments, the sealing composition may have a density of from 55 pounds per cubic foot ($lbm/ft^3$) to 170 $lbm/ft^3$ measured immediately after addition of the curing agent and before substantial curing has occurred.

For primary sealing and remedial sealing operations, the sealing composition may be formulated to have reduced resistance to flow compared to LCM compositions. The reduced resistance to flow of the sealing composition may enable the sealing composition to be easily transferred into the annulus. In some embodiments, the sealing composition may have a viscosity that enables the sealing composition to exert hydrostatic pressure on the wellbore wall or interior surface of an outer casing to support the wellbore, prevent fluids from flowing from the subterranean formation into the wellbore, or both. However, the viscosity of the sealing composition may be reduced to enable the sealing composition to be efficiently transported into the annulus. In some embodiments, the sealing composition may have a viscosity of from 1 millipascal second (mPa·s) to 50,000 mPa·s before curing. The viscosity of the sealing composition may be determined according to the methods subsequently provided in this disclosure. In some embodiments, the sealing composition may have a viscosity of from 1 mPa·s to 100,000 mPa·s, from 1 mPa·s to 10,000 mPa·s, from 1 mPa·s to 1,000 mPa·s, from 1 mPa· to 500 mPa·s, from 1 mPa·s to 100 mPa·s, from 1 mPa·s to 10 mPa·s, from 2 mPa·s to 200,000 mPa·s, from 2 mPa·s to 100,000 mPa·s, from 2 mPa·s to 10,000 mPa·s, from 2 mPa·s to 1,000 mPa·s, from 2 mPa· to 500 mPa·s, from 2 mPa·s to 100 mPa·s, from 2 mPa·s to 10 mPa·s, from 10 mPa·s to 200,000 mPa·s, from 10 mPa·s to 100,000 mPa·s, from 10 mPa· to 10,000 mPa·s, from 100 mPa·s to 200,000 mPa·s, from 100 mPa·s to 100,000 mPa·s, from 100 mPa·s to 10,000 mPa·s, from 100 mPa·s to 1,000 mPa·s, from 1,000 mPa· to 200,000 mPa·s, from 1,000 mPa·s to 100,000 mPa·s, from 1,000 mPa·s to 10,000 mPa·s, from 10,000 mPa·s to 200,000 mPa·s, or from 10,000 mPa·s to 100,000 mPa·s measured immediately after addition of the curing agent and before substantial curing has taken place.

The sealing composition may have a gel strength before curing that maintains the pump-ability of the sealing composition to prevent stuck-pipe problems. The gel strength refers to the shear stress of a fluid measured at a reduced shear rate following a defined period of time during which the fluid is maintained in a static state. In some embodiments, the sealing composition may have a density of greater than 100 $lbm/ft^3$ or greater than 120 $lbm/ft^3$, and the gel strength may enable the sealing composition to suspend the weighting agents in sealing composition added to increase the density. In some embodiments, the sealing compositions may have a 10-second gel strength of from 0.1 pound of force per square foot (lbf/100 ft$^2$) to 20 lbf/100 ft$^2$, from 0.1 lbf/100 ft$^2$ to 10 lbf/100 ft$^2$, from 0.1 lbf/100 ft$^2$ to 5 lbf/100 ft$^2$, from 1 lbf/100 ft$^2$ to 20 lbf/100 ft$^2$, from 1 lbf/100 ft$^2$ to 10 lbf/100 ft$^2$, from 1 lbf/100 ft$^2$ to 5 lbf/100 ft$^2$, from 5 lbf/100 ft$^2$ to 20 lbf/100 ft$^2$, from 5 lbf/100 ft$^2$ to 10 lbf/100 ft$^2$, or from 0.1 lbf/100 ft$^2$ to 1 lbf/100 ft$^2$ measured immediately after addition of the curing agent and before substantial curing has taken place. In some embodiments, the sealing composition may have a 10-minute gel strength of from 0.1 lbf/100 ft$^2$ to 30 lbf/100 ft$^2$, from 0.1 lbf/100 ft$^2$ to 20 lbf/100 ft$^2$, from 0.1 lbf/100 ft$^2$ to 10 lbf/100 ft$^2$, from 0.1 lbf/100 ft$^2$ to 5 lbf/100 ft$^2$, from 1 lbf/100 ft$^2$ to 30 lbf/100 ft$^2$, from 1 lbf/100 ft$^2$ to 20 lbf/100 ft$^2$, from 1 lbf/100 ft$^2$ to 10 lbf/100 ft$^2$, from 1 lbf/100 ft$^2$ to 5 lbf/100 ft$^2$, from 5 lbf/100 ft$^2$ to 30 lbf/100 ft$^2$, from 5 lbf/100 ft$^2$ to 2 lbf/100 ft$^2$, from 5 lbf/100 ft$^2$ to 10 lbf/100 ft$^2$, from 10 lbf/100 ft$^2$ to 30 lbf/100 ft$^2$, from 10 lbf/100 ft$^2$ to 20 lbf/100 ft$^2$, or from 20 lbf/100 ft$^2$ to 30 lbf/100 ft$^2$ measured immediately after addition of the curing agent and before substantial curing has taken place. The 10-second gel strength and 10-minute gel strength may be measured according to the test methods subsequently described in this disclosure.

The plastic viscosity (PV) of a fluid relates to the resistance of a fluid to flow due to mechanical interaction between the solids of the fluid and represents the viscosity of the fluid extrapolated to infinite shear rate. The sealing composition may have a PV that enables the sealing composition to be easily transferred through the interior volume of the tubular string and into the annulus. The PV of the sealing composition may be measured immediately after addition of the curing agent and before substantial curing has taken place. The PV of the sealing composition may be determined in accordance with the test methods subsequently described in this disclosure. In some embodiments, the sealing composition may have a PV of from 0.1 centipoise (cP) to 50 cP, from 0.1 cP to 30 cP, from 0.1 cP to 20 cP, from 0.1 cP to 10 cP, from 1 cP to 50 cP, from 1 cP to 30 cP, from 1 cP to 20 cP, from 1 cP to 10 cP, from 5 cP to 50 cP, from 5 cP to 30 cP, from 5 cP to 20 cP, or from 5 cP to 10 cP measured immediately after addition of the curing agent and before substantial curing has taken place (1 cP=1 millipascal second (mPa·s)). The PV of the sealing composition may depend on the quantity of solids added to the sealing composition. For example, addition of weighting agents to the sealing composition to increase the density may also increase the PV of the sealing composition.

The yield point (YP) of a fluid relates to the amount of stress required to move the fluid from a static condition. In some embodiments, the sealing compositions may have a YP that enables the sealing composition to be efficiently transferred into the annulus. Alternatively, in other embodiments, the sealing compositions may include weighting agents and may have a greater YP to enable the sealing compositions to suspend the weighting agents. In some embodiments, the sealing composition may have a YP that prevents the sealing composition from flowing out of remediation zone when the sealing composition is used in remedial operations to repair the well. In some embodiments, the sealing composition may have a YP of from 0.1 lbf/100 ft$^2$ to 400 lbf/100 ft$^2$, from 0.1 lbf/100 ft$^2$ to 300 lbf/100 ft$^2$, from 0.1 lbf/100 ft$^2$ to 200 lbf/100 ft$^2$, from 0.1 lbf/100 ft$^2$ to 100 lbf/100 ft$^2$, from 0.1 lbf/100 ft$^2$ to 10 lbf/100 ft$^2$, from 1 lbf/100 ft$^2$ to 400 lbf/100 ft$^2$, from 1 lbf/100 ft$^2$ to 300 lbf/100 ft$^2$, from 1 lbf/100 ft$^2$ to 200 lbf/100 ft$^2$, from 1 lbf/100 ft$^2$ to 100 lbf/100 ft$^2$, from 1 lbf/100 ft$^2$ to 10 lbf/100 ft$^2$, from 10 lbf/100 ft$^2$ to 400 lbf/100 ft$^2$, from 10 lbf/100 ft$^2$ to 300 lbf/100 ft$^2$, from 10 lbf/100 ft$^2$ to 200 lbf/100 ft$^2$, from 10 lbf/100 ft$^2$ to 100 lbf/100 ft$^2$, from 100 lbf/100 ft$^2$ to 400 lbf/100 ft$^2$, from 100 lbf/100 ft$^2$ to 300 lbf/100 ft$^2$, from 100 lbf/100 ft$^2$ to 200 lbf/100 ft$^2$, from 200 lbf/100 ft$^2$ to 400 lbf/100 ft$^2$, or from 300 lbf/100 ft$^2$ to 400 lbf/100 ft$^2$.

The epoxy resins, once cured, may be more chemically resistant than conventional cement compositions. For example, the fluids from the subterranean formation, such as hydrocarbon gases, crude oil, or produced water, may include hydrogen sulfide gas ($H_2S$), which is highly corrosive. In some embodiments, the cured epoxy resins incorporated into the sealing compositions and LCM compositions may be resistant to corrosion caused by $H_2S$ gas present in fluids in the subterranean formation.

In some embodiments, the sealing composition may include a cement slurry in addition to the epoxy resin and the curing agent. For example, in some embodiments, the sealing composition may include from 0.1 wt. % to 75 wt. % cement slurry based on the total weight of the sealing composition. In other embodiments, the sealing composition may include from 0.1 wt. % to 50 wt. %, from 0.1 wt. % to 25 wt. %, from 0.1 wt. % to 10 wt. %, from 1 wt. % to 75 wt. %, from 1 wt. % to 50 wt. %, from 1 wt. % to 25 wt. %, from 1 wt. % to 10 wt. %, from 10 wt. % to 75 wt. %, from 10 wt. % to 50 wt. %, from 10 wt. % to 25 wt. %, from 25 wt. % to 75 wt. %, from 25 wt. % to 50 wt. %, or from 50 wt. % to 75 wt. % cement slurry based on the total weight of the sealing composition.

The cement slurry may include water, a cement precursor material, and a surfactant. The cement precursor material may be any suitable material which, when mixed with water, can be cured into a cement. The cement precursor material may be hydraulic or non-hydraulic cement precursors. A hydraulic cement precursor material refers to a mixture of limestone, clay and gypsum burned together under extreme temperatures that may begin to harden instantly or within a few minutes while in contact with water. A non-hydraulic cement precursor material refers to a mixture of lime, gypsum, plasters and oxychloride. A non-hydraulic cement precursor may take longer to harden or may require drying conditions for proper strengthening, but often is more economically feasible. While hydraulic cement may be more commonly utilized in drilling applications, it should be understood that other cements are contemplated. In some embodiments, the cement precursor material may be Portland cement precursor. Portland cement precursor is a hydraulic cement precursor (cement precursor material that not only hardens by reacting with water but also forms a water-resistant product) produced by pulverizing clinkers, which contain hydraulic calcium silicates and one or more of the forms of calcium sulphate as an inter-ground addition.

The cement precursor material may include one or more of calcium hydroxide, silicates, oxides, belite ($Ca_2SiO_5$), alite ($Ca_3SiO_4$), tricalcium aluminate ($Ca_3Al_2O_6$), tetracalcium aluminoferrite ($Ca_4Al_2Fe_2O_{10}$), brownmilleriate ($4CaO.Al_2O_3.Fe_2O_3$), gypsum ($CaSO_4.2H_2O$) sodium oxide, potassium oxide, limestone, lime (calcium oxide), hexavalent chromium, calcium alluminate, or combinations of these. The cement precursor material may include Portland cement, siliceous fly ash, calcareous fly ash, slag cement, silica fume, any known cement precursor material or combinations of any of these. In some embodiments, the cement slurry may contain from 10 wt. % to 90 wt. % of the cement precursor material based on the total weight of the cement slurry. For instance, the cement slurry may contain from 10 wt. % to 80 wt. %, from 10 wt. % to 70 wt. %, from 10 wt. % to 60 wt. %, or from 10 wt. % to 50 wt. % of the cement precursor material.

Water may be added to the cement precursor material to produce the cement slurry. The water may be distilled water, deionized water, or tap water. In some embodiments, the water may contain additives or contaminants. For instance, the water may include freshwater or seawater, natural or synthetic brine, salt water, formation water, or brackish water, or combinations of these. In some embodiments, salt or other organic compounds may be incorporated into the water to control certain properties of the water, and thus the cement slurry, such as density. Suitable salts may include, but are not limited to, alkali metal chlorides, hydroxides, or carboxylates. In some embodiments, suitable salts may include sodium, calcium, cesium, zinc, aluminum, magnesium, potassium, strontium, silicon, lithium, chlorides, bromides, carbonates, iodides, chlorates, bromates, formates, nitrates, sulfates, phosphates, oxides, fluorides, and combinations of these. In some embodiments, the cement slurry may contain from 5 wt. % to 70 wt. % water based on the total weight of the cement slurry.

The cement slurry may contain from 0.1 wt. % to 10 wt. % of the surfactant based on the total weight of the cement slurry. In some embodiments, the cement slurry may contain from 0.1 wt. % to 50 wt. % of the one or more additives based on the total weight of the cement slurry. In some embodiments, the one or more additives may include a dispersant containing one or more anionic groups. For instance, the dispersant may include synthetic sulfonated polymers, lignosulfonates with carboxylate groups, organic acids, hydroxylated sugars, other anionic groups, or combinations of any of these. In some embodiments, the one or more additives may alternatively or additionally include a fluid loss additive. In some embodiments, the cement fluid loss additive may include non-ionic cellulose derivatives. In some embodiments, the cement fluid loss additive may be hydroxyethylcellulose (HEC). In other embodiments, the fluid loss additive may be a non-ionic synthetic polymer (for example, polyvinyl alcohol or polyethyleneimine). In some embodiments, the fluid loss additive may be an anionic synthetic polymer, such as 2-acrylamido-2-methylpropane sulfonic acid (AMPS) or AMPS-copolymers, including lattices of AMPS-copolymers. In some embodiments, the fluid loss additive may include bentonite, which may additionally viscosify the cement slurry and may, in some embodiments, cause retardation effects.

The sealing compositions described in this disclosure may be used in methods for primary sealing an annulus of a wellbore or in methods of remediating or repairing weak zones of a cement sheath of an existing hydrocarbon production well. Weak zones may be identified from a well log generated from physical measurement of the wellbore by one or a plurality of instruments inserted into the wellbore. In some embodiments, a method for sealing an annulus of a wellbore may include introducing a spacer fluid into a tubular string positioned in the wellbore, the spacer fluid displacing at least a portion of a drilling fluid disposed in the wellbore. The method may also include introducing a sealing composition into the tubular string positioned in the wellbore to displace at least a portion of the spacer fluid. The sealing composition may include any of the sealing compositions previously described in this disclosure. The method may further include introducing a displacement fluid into the wellbore to transfer the sealing composition into an annulus of the well and curing the sealing composition.

In some embodiments, the method may further include curing the sealing composition for at least 4 hours. Alternatively, in other embodiments, the method may include curing the sealing composition for a cure time of from 4 hours to 12 hours. In some embodiments, the spacer fluid and the sealing composition may be introduced to the wellbore through the drill string.

In other embodiments, a method for repairing a weak zone in a hydrocarbon production well may include perforating at least one tubular string in the weak zone of the hydrocarbon production well and injecting the sealing composition through the tubular string and into the weak zone of the hydrocarbon production well. The sealing composition may include any of the sealing compositions previously described in this disclosure. The method may further include curing the sealing composition.

In some embodiments, the method may further include identifying the weak zone of a cement sheath of the hydrocarbon production well. In some embodiments, the weak zones of a cement sheath may be identified by examining the cement bond log. The cement bond log refers to documentation of the integrity of the cement seal placed in the wellbore annulus or casing-casing annulus of the wellbore and may be generated using a sonic resonance tool or other tool to evaluate the bonding of the cement composition in the annuli. Additionally, in some embodiments, the method may include determining the volume and densities of the spacer fluid, preflush fluid, or both. The method may further include determining the density, volume, or both of the sealing composition to be injected into the weak zones.

LCM compositions that include the epoxy resin system will now be described. As previously discussed in this disclosure, the LCM compositions may include the epoxy resin system comprising at least one epoxy resin and at least one curing agent. The LCM compositions may include any of the epoxy resins, reactive or non-reactive diluents, or curing agents previously described in this disclosure.

In some embodiments, the LCM composition may include an amount of the epoxy resin necessary to form a cured epoxy composition. For example, in some embodiments, the LCM composition may include from 50 wt. % to 97 wt. % epoxy resin based on the total weight of the LCM composition before curing. In other embodiments, the LCM composition may include from 50 wt. % to 95 wt. %, from 50 wt. % to 90 wt. %, from 50 wt. % to 80 wt. %, from 50 wt. % to 70 wt. %, from 50 wt. % to 60 wt. %, from 60 wt. % to 97 wt. %, from 60 wt. % to 95 wt. %, from 60 wt. % to 90 wt. %, from 60 wt. % to 80 wt. %, from 60 wt. % to 70 wt. %, from 70 wt. % to 97 wt. %, from 70 wt. % to 95 wt. %, from 70 wt. % to 90 wt. %, from 70 wt. % to 80 wt. %, from 80 wt. % to 97 wt. %, from 80 wt. % to 95 wt. %, from 80 wt. % to 90 wt. %, from 90 wt. % to 97 wt. %, from 90 wt. % to 95 wt. %, or from 95 wt. % to 97 wt. % epoxy resin based on the total weight of the LCM composition before curing.

In some embodiments, the LCM composition for sealing lost circulation zones may include an amount of curing agent that cures the epoxy resin in less than 3 hours, less than 2 hours, or even less than 1 hour. In some embodiments, the LCM composition may include an amount of curing agent that cures the epoxy resin within a curing time of from 0.5 hours to 3 hours. In some embodiments, the LCM composition may include from 2 wt. % to 30 wt. % curing agent based on the total weight of the LCM composition before curing. In other embodiments, the LCM composition may have from 2 wt. % to 25 wt. %, from 2 wt. % to 20 wt. %, from 2 wt. % to 15 wt. %, from 2 wt. % to 10 wt. %, from 5 wt. % to 30 wt. %, from 5 wt. % to 25 wt. %, from 5 wt. % to 20 wt. %, from 5 wt. % to 15 wt. %, from 5 wt. % to 10 wt. %, from 10 wt. % to 30 wt. %, from 10 wt. % to 25 wt. %, from 10 wt. % to 15 wt. %, or from 10 wt. % to 20 wt. % curing agent based on the total weight of the LCM composition before curing.

Additionally, the LCM compositions may include any of the weighting agents, accelerators, or retarders previously described in this disclosure. For example, in some embodiments, the LCM composition may include an accelerator. In some embodiments, the LCM composition may include an amount of the accelerator that decreases the cure time from 4 hours or more to less than 3 hours so that the cure time may be in a range of from 0.5 hours to 3 hours. In some embodiments, the LCM composition may include from 0.01 wt. % to 10 wt. % accelerator based on the total weight of the LCM composition prior to curing. In other embodiments, the LCM composition may include from 0.01 wt. % to 5 wt. %, from 0.01 wt. % to 3 wt. %, from 0.01 wt. % to 1 wt. %, from 0.1 wt. % to 10 wt. %, from 0.1 wt. % to 5 wt. %, from 0.1 wt. % to 3 wt. %, from 0.1 wt. % to 1 wt. %, from 1 wt. % to 10 wt. %, from 1 wt. % to 5 wt. %, or from 1 wt. % to 3 wt. % accelerator based on the total weight of the LCM composition prior to curing.

The LCM compositions may include one or more weighting materials. The weighting materials may be particulate solids having a specific gravity (SG) that increases the density of the LCM composition. Weighting materials may be added to the LCM compositions to increase the density of the final cured epoxy resin and to increase the hydrostatic pressure exerted by the LCM composition on the formation into which the LCM composition is introduced. As previously discussed in this disclosure, the final density of the cured resin of the LCM composition may depend on the geology of the subterranean formation in the zone being remediated. For example, in some embodiments, the subterranean formation may require a LCM composition with a greater density to support the wellbore and prevent flow of fluids from the subterranean formation into the wellbore during curing of the sealing composition. The increased density and hydrostatic pressure of the LCM composition may prevent displacement of the LCM composition by fluids from the formation.

The LCM composition may include an amount of weighting material that increases the density of the LCM composition. The weighting material added to the LCM may be any of the weighting materials previously described in this disclosure. In some embodiments, the LCM composition may include from 0.1 wt. % to 40 wt. % weighting material based on the total weight of the LCM composition prior to curing. For example, in some embodiments, the LCM composition may include from 0.1 wt. % to 30 wt. %, from 0.1 wt. % to 20 wt. %, from 0.1 wt. % to 10 wt. %, from 1 wt. % to 40 wt. %, from 1 wt. % to 30 wt. %, from 1 wt. % to 20 wt. %, from 1 wt. % to 10 wt. %, from 5 wt. % to 40 wt. %, from 5 wt. % to 30 wt. %, from 5 wt. % to 20 wt. %, from 5 wt. % to 10 wt. %, from 10 wt. % to 40 wt. %, from 10 wt. % to 30 wt. %, from 10 wt. % to 20 wt. %, or from 20 wt. % to 40 wt. % weighting material based on the total weight of the LCM composition before curing.

The epoxy resins in the LCM composition are initially in liquid form. As previously described in this disclosure, the epoxy resins build viscosity during curing and eventually cure to a non-porous three-dimensional network. The LCM compositions may have a cure time that is less than the cure time of the sealing compositions. In some embodiments, the LCM compositions may have a cure time of less than or equal to 3 hours, less than or equal to 2 hours, or less than or equal to 1 hour. In other embodiments, the LCM compositions may have a cure time of from 0.1 hours to 3 hours, from 0.1 hours to 2 hours, from 0.1 hour to 1 hours, from 0.1 hours to 0.5 hour, 0.5 hours to 3 hours, from 0.5 hours to 2 hours, from 0.5 hour to 1 hours, 1 hour to 3 hours, from 1 hour to 2 hours, or from 2 hour to 3 hours.

As previously described, the LCM composition may include 50 wt. % to 97 wt. % epoxy resin and from 2 wt. % to 30 wt. % curing agent. In some embodiments, the curing agent may include at least one of TEPA, DETA, TETA, or IPDA. In some embodiments, the epoxy resin of the LCM composition may include from 0.1 weight percent to 80 weight percent bisphenol-A-epichlorohydrin epoxy resin based on the total weight of the epoxy resin in the composition and further comprises a reactive diluent. The reactive diluent may comprise the balance of the epoxy resin of the LCM composition. In some embodiments, the reactive diluent may include $R^2$—O—$CH_2$—$(C_2H_3O)$, where $R^2$ is an alkyl having from 12 to 14 carbon atoms. In some embodiments, the LCM composition may comprise, consist of, or consist essentially of 50 wt. % to 80 wt. % bisphenol-A-epichlorohydrin epoxy resin based on the total weight of the epoxy resin in the composition, 14 wt. % to 16 wt. % reactive diluent, and 1 wt. % to 30 wt. % TEPA curing agent. In other embodiments, the LCM composition may include from 50 wt. % to 97 wt. % epoxy resin comprising a combination of 1,6-hexanediol diclycidyl ether and bisphenol-A-epichlorohydrin epoxy resin.

The LCM compositions may be used for sealing lost circulation zones in a wellbore under a range of different downhole conditions. For example, in some embodiments, the LCM composition may be adapted to different downhole conditions by changing the concentrations of the epoxy resin, curing agents, accelerators, or weighting materials in the LCM compositions to modify the specific gravity, viscosity, mechanical properties, curing time, or other properties of the LCM compositions.

The LCM compositions may be capable of withstanding a wide range of temperatures and pressures without failing or deteriorating to allow liquids or gases to penetrate into or through the LCM compositions. For example, the LCM compositions, once cured, may be capable of withstanding temperatures of from 20 degrees Celsius (° C.) to 205° C. The cured LCM compositions may also be able to withstand temperature cycling within a temperature range of from 20° C. to 205° C. The cured LCM compositions may be capable of withstanding pressures of up to 4,000,000 pounds of force per square inch (psi) (1 psi equals 6.89476 kilopascals (kPa)). For example, in some embodiments, the cured LCM compositions may be capable of withstanding pressures of from 14 psi to 4,000,000 psi without failing or deteriorating to allow liquids or gases to penetrate into or through the LCM compositions.

The rheology and density of the LCM compositions can be adjusted over a wide range of values depending on the requirement for the well and the downhole conditions of the well. The LCM composition may have a density that enables the LCM composition to exert hydrostatic pressure on the formation when introduced to the lost circulation zone. In some embodiments, the LCM composition may have a density as previously described in this disclosure for the sealing composition.

For remediation of lost circulation zones, the LCM compositions may be formulated to have greater resistance to flow (greater rheology) compared to sealing compositions. The greater resistance to flow of the LCM composition may enable the LCM composition to be introduced to the lost circulation zone while preventing the LCM composition from flowing easily through the lost circulation zone and being lost to the formation. In some embodiments, the LCM composition may have a viscosity that enables the LCM composition to exert hydrostatic pressure within the formation to prevent loss of the LCM composition to the formation. However, the viscosity of the LCM composition may enable the LCM composition to be efficiently injected into the formation in the lost circulation zone. In some embodiments, the LCM composition may have a viscosity of from 2 millipascal second (mPa·s) to 200,000 mPa·s before curing. The viscosity of the LCM compositions may be determined according to the methods subsequently provided in this disclosure. In some embodiments, the LCM composition may have a viscosity of from 2 mPa·s to 100,000 mPa·s, from 2 mPa·s to 10,000 mPa·s, from 2 mPa·s to 1,000 mPa·s, from 2 mPa· to 500 mPa·s, from 2 mPa·s to 100 mPa·s, from 2 mPa·s to 10 mPa·s, from 10 mPa·s to 200,000 mPa·s, from 10 mPa·s to 100,000 mPa·s, from 10 mPa· to 10,000 mPa·s, from 100 mPa·s to 200,000 mPa·s, from 100 mPa·s to 100,000 mPa·s, from 100 mPa·s to 10,000 mPa·s, from 100 mPa·s to 1,000 mPa·s, from 1,000 mPa· to 200,000 mPa·s, from 1,000 mPa·s to 100,000 mPa·s, from 1,000 mPa·s to 10,000 mPa·s, from 10,000 mPa·s to 200,000 mPa·s, or from 10,000 mPa·s to 100,000 mPa·s before curing.

The LCM composition may have a gel strength before curing that maintains the pump-ability of the LCM composition to prevent stuck-pipe problems. In some embodiments, the LCM composition may have a density of greater than 100 lbm/ft$^3$ or greater than 120 lbm/ft$^3$, and may have a gel strength that enables the LCM composition to suspend the weighting agents added to increase the density. In some embodiments, the LCM composition may have a gel strength before curing that prevents the LCM composition from flowing further into the formation after injection of the LCM into the formation. In some embodiments, the LCM composition may have a 10-second gel strength and a 10-minute gel strength as previously described in this disclosure for the sealing composition.

The LCM composition may have a PV that enables the LCM composition to be injected into the formation, such as into a low-injectivity zone. In some embodiments, the LCM composition may have a PV as previously described in this disclosure for the sealing composition.

In some embodiments, the LCM compositions may have a YP that prevents the LCM composition from flowing further into the formation once the LCM composition has been introduced to the formation, such as through injection. In some embodiments, the LCM composition may include weighting agents and may have a YP that enables the LCM composition to suspend the weighting agent in the LCM composition and reduce settling. In some embodiments, the LCM composition may have a YP as previously described in this disclosure for the sealing composition.

The LCM compositions may be used in a method to isolate a lost circulation zone of a wellbore, which may be encountered during drilling operations. The method of sealing a lost circulation zone of a wellbore may include introducing a spacer fluid into the lost circulation zone and introducing a LCM composition into the lost circulation zone. The spacer fluid may provide separation between the drilling fluid previously in the wellbore and lost to the lost circulation zone and the LCM composition, which may be incompatible with the drilling fluid. In some embodiments, a washer fluid may be introduced to the lost circulation zone prior to introducing the spacer fluid to the lost circulation zone. The method may further include introducing a displacement fluid to the wellbore and formation after the LCM composition to displace the LCM composition into the formation. The LCM composition may include any of the epoxy resins, curing agents, weighting agents, accelerators, or other additives previously described in this disclosure. The method may further include curing the LCM composition to form a cured LCM composition sealing the lost circulation zone. After curing, the lost circulation zone may be isolated from the other portions of the wellbore by the cured LCM composition.

In some embodiments, the spacer fluid, LCM composition, or both may be introduced to the lost circulation zone by injecting the spacer fluid, LCM composition, or both into the formation at the lost circulation zone. In some embodiments, injection of the spacer fluid, LCM composition, or both may be accomplished by the process of "squeezing" the spacer fluid, LCM composition, or both into the formation. In some embodiments, the spacer fluid, the LCM composition, or both may be introduced to the lost circulation zone through the drill string disposed within the wellbore. In some embodiments, the spacer fluid, the LCM composition or both may be introduced to the lost circulation zone through the drill bit of the drill string. In some embodiments, the lost circulation zone is a low-injectivity zone.

Once the LCM composition has cured into a solid, drilling the wellbore may re-commence. In some embodiments, the drill string and drill may be used to drill through at least a portion of the LCM composition to continue drilling the wellbore.

Test Methods

Viscosity

The viscosity of the sealing compositions or LCM compositions may be measured using a standard oilfield viscometer, such as a FANN® Model 35 viscometer manufactured by Fann Instrument Company for example, according to test methods provided in the API Recommended Practice For Cementing (RP 10B). The viscosity is reported as shear stress in units of pounds of force per 100 square feet (lbf/100 ft$^2$). The viscometer may also be used to measure the shear rate of the sealing compositions or LCM compositions.

Gel Strength

The gel strength refers to the shear stress of the sealing composition or LCM composition measured at a reduced shear rate following a defined period of time during which the sealing composition is maintained in a static state. The shear stress of the composition at reduced shear rate may be measured using a standard oilfield viscometer, such as a FANN® Model 35 viscometer operated at reduced rpms, such as at 3 rpm, according to the test methods described in API Recommended Practice On Determining the Static Gel Strength of Cement Formulations (RP 10B-6/ISO 10426-6: 2008). To measure the gel strength, the sealing composition or LCM composition is first stirred by contacting the composition with the spindle of the viscometer and operating the viscometer at 600 rotations per minute (rpm). The viscometer is then turned off for a period of time (time period). For a 10-second gel strength, the time period is 10 seconds, and for a 10-minute gel strength, the time period is 10 minutes. It should be understood that other time periods for measuring gel strength may be used as reference times for measurements of gel strength. During the time period, the composition comes to rest in a static state. Upon expiration of the time period, the viscometer is turned back on at a reduced speed, such as 3 rpm for example, to generate a reduced shear rate. The viscometer reading is then taken. The gel strength of the sealing composition or LCM composition is reported in units of pounds of force per 100 square feet (lbf/100 ft$^2$).

Plastic Viscosity and Yield Point

The rheology of the sealing compositions and LCM compositions may be modeled based on Bingham plastic flow behavior. In particular, the sealing compositions and LCM compositions may behave as a rigid body at lesser shear stress but flow as a viscous fluid at greater shear stress. The rheological behavior of the compositions may be determined by measuring the shear stress on the composition at different shear rates, which may be accomplished by measuring the shear stress, the shear rate, or both on the composition using a FANN® Model 35 viscometer operated at 3 rpm, 6 rpm, 100 rpm, 200 rpm, 300 rpm, or 600 rpm, for example. The rheology of the sealing composition or LCM composition may be evaluated from the plastic viscosity (PV) and the yield point (YP), which are parameters from the Bingham plastic rheology model. The PV is related to the resistance of the composition to flow due to mechanical interaction between the solids of the composition and represents the viscosity of the composition extrapolated to infinite shear rate. The PV reflects the type and concentration of the solids, such as weighting materials, in the sealing composition or LCM composition, and a lesser PV is preferred. The PV of the sealing composition or LCM composition may be estimated by measuring the shear stress of the composition using a FANN® Model 35 viscometer at spindle speeds of 300 rotations per minute (rpm) and 600 rpm and subtracting the 300 rpm viscosity measurement from the 600 rpm viscosity measurement according to Equation 3 (EQU. 3), which is subsequently provided. The PV values determined for the sealing compositions and LCM compositions are provided in this disclosure in units of centipoise (cP).

$$PV=\text{(viscosity at 600 rpm)}-\text{(viscosity at 300 rpm)} \quad \text{EQU. 3}$$

At shear stress less than the YP of the sealing composition, the sealing composition behaves as a rigid body, and at shear stress greater than the YP of the sealing composition, the sealing composition flows as a viscous fluid. In other words, the YP represents the amount of stress required to move a fluid from a static condition. The YP is determined by extrapolating the Bingham plastic rheology model to a shear rate of zero. The YP of the sealing composition or the LCM composition may be estimated from the PV from EQU. 3 by subtracting the PV from the shear stress measured at 300 rpm according to Equation 4 (EQU. 4), which is provided subsequently.

$$YP=\text{(300 rpm reading)}-PV \quad \text{EQU. 4}$$

The YP is expressed as a force per area, such as pounds of force per one hundred square feet (lbf/100 ft$^2$) for example. The methods for measuring and determining PV and YP for the sealing compositions are consistent with methods conventionally used for drilling fluids in general.

Shear Bond Test

A shear bond test determines the force required to move a pipe through a column of set cement or a sealing composition. This shear bond strength can be used to determine the length of pipe a column of set cement or sealing composition can support. The shear bond test includes filling an annulus between two pieces of pipe with a cement slurry or a sealing composition and letting it set. After the cement or sealing composition sets, the outer pipe is supported on the bottom platen of a load press while force is applied to the center pipe by the load press. The load indication on the press increases until the bond breaks between the pipe and the cement or sealing composition. This loading force is converted to a force per unit area and is called the shear bond strength.

Preparing the Shear Bond Test Mold: The shear bond mold includes a bottom pipe-centering device, an outer sleeve, an inner pipe, and a top centering device. When assembled, the shear bond mold defines an annular space between the outer sleeve and the inner pipe. All pieces of the shear bond test mold are thoroughly cleaned before assembling the pieces for testing. Care should be taken to make sure the inner pipe and the outer sleeve do not have any mold release agents, such as oil or grease, in the areas in which the cement or sealing composition will contact. After cleaning, the bottom pipe-centering device is installed in the bottom of the outer sleeve. 0-rings may be used to seal the inner pipe and the outer sleeve. The inner pipe is installed in the bottom pipe-centering device and aligned with the outer sleeve such that the inner pipe and the outer sleeve are concentric.

Filling the Test Mold: The cement or sealing composition is prepared and mixed according to standard American Petroleum Institute (API) procedures (or appropriate procedures for specialized slurries). The cement or sealing composition, in the form of a slurry, is then poured into the annular space between the inner and outer pipe, while slowly stirring the slurry with a spatula to minimize the possibility of settling. The slurry is then puddled with a glass rod or spatula to remove any trapped air and the top centering device is placed on top of the slurry and in contact with the inner pipe and outer sleeve to center the inner pipe with respect to the outer sleeve. The bottom centering device and the top centering device cooperate to maintain the inner pipe center relative to the outer sleeve while the cement or sealing composition cures or sets.

Curing the Slurry: The shear bond test mold filled with the cement or sealing composition slurry is then placed in the curing medium, which can be a water bath or a pressure-curing chamber. The cement or sealing composition is then cured according to the appropriate test conditions in the same manner as for curing a compressive strength specimen. Before the end of the curing time, the test specimens are removed from the water bath, one at a time and, as quickly as possible, perform the following: (1) remove the top centering device from the curing mold; (2) remove the bottom centering device from the mold; (3) determine the height of the cement or sealing composition in contact with the inner pipe; and (4) place the test specimen back into the water bath and let the temperature stabilize for approximately 30 minutes before testing for shear bond strength. At the end of the curing period, the specimen should be maintained at the lesser of the curing temperature or a temperature of from 170 degrees Fahrenheit (° F.) (77 degrees Celsius (° C.)) to 190° F. (88° C.) until the specimen is tested. The specimen should not be allowed to cool to room temperature, because cooling to room temperature may cause thermal shrinkage of the specimen and mold, which can alter the test results. If the specimen is cured using a pressure-curing vessel, the pressure-curing vessel can be cooled to a temperature of from 170° F. (77° C.) and 190° F. (88° C.) and, if necessary, the test specimens can be removed from the pressure-curing vessel and placed into a water bath of the same temperature until the time of testing.

Testing for Shear Bond Strength: The press is adjusted so that the specimen fits between the top and bottom loading platens of the press. The test specimen is removed from the water bath and quickly placed between the loading platens with the outer sleeve in contact with the bottom loading platen and the inner pipe in contact with the upper loading platen. A loading force is applied to the test specimen by the press at a uniform rate (as in testing for compressive strength). When the shear bond breaks, the inner pipe moves downward through the set cement or sealing composition and the loading force begins to decrease. The maximum force reached before the pipe moved and the force began to decrease is recorded and used to determine the shear bond strength.

The cement contact area is determined using Equation 5 (EQU. 5), which is subsequently provided in this disclosure.

$$CCA = CCH \times \pi \times D \qquad \text{EQU. 5}$$

In EQU. 5, CCA is the cement contact area in inches squared (in$^2$), CCH is the cement contact height on the pipe in inches (in), and D is the diameter of the pipe in inches (in). The diameter D in EQU. 5 will normally be the outside diameter of the inner pipe, however, if movement occurs between the set cement or sealing composition and the outer sleeve, the inside diameter of the outer sleeve may also be used calculating the cement contact area. The shear bond strength may then be calculated from Equation 6 (EQU. 6), which is subsequently provided in this disclosure.

$$SBS = \frac{MF}{CCA} \qquad \text{EQU. 6}$$

In EQU. 6, SBS is the shear bond strength in pounds per square inch (psi), MF is the maximum force applied to the test specimen in pounds of force (lbf), and CCA is the cement contact area in inches squared calculated from EQU. 5.

EXAMPLES

The following examples illustrate one or more features of the present disclosure. It should be understood that these examples are not intended to limit the scope of the disclosure or the appended claims in any manner. In these Examples, four epoxy resins were evaluated for use in the sealing compositions described in the present disclosure. Table 1 is subsequently included in this disclosure and provides a cross-reference for the epoxy resins utilized.

TABLE 1

Cross-Reference of Epoxy Resins

| Epoxy Resin ID | Epoxy Resin Name |
| --- | --- |
| Resin 1 | bisphenol-A-epichlorohydrin epoxy resin with the reactive diluent oxirane mono [(C12-C14)-alkyloxy)methyl] derivatives |
| Resin 2 | 2,3-epoxypropyl-o-tolyl ether |
| Resin 3 | C12-C14 alkyl glycidyl ether |
| Resin 4 | 1,6-hexanediol diglycidyl ether |

Example 1: Rheological Properties of Epoxy Resins

Resins 1 through 4 were evaluated for rheological properties according to the test methods previously described in this disclosure. The rheological properties of the four resins were measured for each resin individually without addition of the curing agent, weighting material, or other additives. The rheological properties measured for Resins 1 through 4 are shown in Table 2, which is subsequently provided in this disclosure.

TABLE 2

Rheological Properties of Resins 1 Through 4

| Rheological Property | Resin 1 | Resin 2 | Resin 3 | Resin 4 |
| --- | --- | --- | --- | --- |
| Shear Stress at 600 rpm (lbf/100 ft$^2$) | 385 | 19 | 19.9 | 46 |
| Shear Stress at 300 rpm (lbf/100 ft$^2$) | 384.6 | 10 | 10.3 | 23.5 |
| Shear Stress at 200 rpm (lbf/100 ft$^2$) | 384.4 | 6.5 | 6.6 | 15.4 |
| Shear Stress at 100 rpm (lbf/100 ft$^2$) | 311.5 | 3.3 | 3.5 | 7.7 |
| Shear Stress at 6 rpm (lbf/100 ft$^2$) | 19.1 | 0.2 | 0.2 | 0.3 |
| Shear Stress at 3 rpm (lbf/100 ft$^2$) | 9.6 | 0.2 | 0.2 | 0.2 |
| 10-second Gel Strength (lbf/100 ft$^2$) | 9.5 | 0.1 | 0.2 | 0.2 |
| 10-Minute Gel Strength (lbf/100 ft$^2$) | 9.4 | 0.1 | 0.1 | 0.1 |
| PV (cP) | 0.4 | 9 | 9.6 | 22.5 |
| YP (lbf/ft$^2$) | 384.2 | 1 | 0.7 | 1 |

As shown in Table 2, Resin 2, Resin 3, and Resin 4 exhibited lesser rheology as shown by the shear stress values of less than 25 lbf/100 ft$^2$ over the range of 3 rpm to 600 rpm for Resins 2, 3, and 4. In contrast, Resin 1 exhibited greater rheology as shown by the increased shear stress values measured over the range of 3 rpm to 600 rpm. Resin 1 also exhibited 10-second and 10-minute gel strengths and yield point that were greater than the 10-second and 10-minute gel strengths and yield point for Resins 2, 3, and 4. As demonstrated by the results in Table 2, the properties of the sealing compositions, LCM compositions, or both may be adjusted by adding or substituting different epoxy resins into the sealing compositions or LCM compositions.

Example 2: Resin 4 with TEPA Curing Agent

In Example 2, Resin 4 was mixed with different quantities of the curing agent TEPA (tetraethylenepentamine) to evaluate the curing time required for sealing compositions comprising Resin 4 and TEPA to change from a liquid phase to a solid or semi-solid phase. A quantity of 100 grams of Resin 4 at 200 degrees Fahrenheit (° F.) (93.3 degrees Celsius (° C.)) was added to each of three containers. Quantities of 3 grams, 5.5 grams, and 6 grams of TEPA curing agent were added to the 100 grams of Resin 4 in one of each of the three containers, and the contents of each container were thoroughly mixed. The mixtures were heated using a hot roll to maintain the temperatures of the mixtures at 200° F. (93.3° C.). Changes in the color, phase, and hardness of each of the mixtures were observed over time. Observations of phase and hardness are subsequently provided in Table 3. The estimated cure times are provided in units of hours (hrs) and minutes (min) throughout these Examples.

TABLE 3

Observations During Cure Time for Resin 4 with TEPA Curing Agent

| Sample ID | Resin | Curing agent | Quantity of Resin (g) | Quantity of Curing Agent (g) | Observation |
| --- | --- | --- | --- | --- | --- |
| 2A | Resin 4 | TEPA | 100 | 3 | Liquid after 8 hrs, semi-solid after a week |
| 2B | Resin 4 | TEPA | 100 | 6 | Semi-solid after 4 hrs 38 min |

TABLE 3-continued

Observations During Cure Time for
Resin 4 with TEPA Curing Agent

| Sample ID | Resin | Curing agent | Quantity of Resin (g) | Quantity of Curing Agent (g) | Observation |
|---|---|---|---|---|---|
| 2C | Resin 4 | TEPA | 100 | 5.5 | Liquid after 8 hrs |

It was observed that each of the mixtures turned darker in color and became thicker in viscosity as time progressed. Each of Samples 2A-2C ultimately cured to a solid sealing composition. As indicated in Table 3, the cure time to cure the mixtures of Resin 4 and TEPA curing agent decreased with increasing quantities of the TEPA curing agent added to Resin 4. Sample 2A having 3 grams of TEPA was liquid after 8 hours and cured to a rubbery solid after a week. Sample 2B having 6 grams of TEPA cured to a semi-solid state in 4 hours and 38 minutes. For Sample 2C, the amount of TEPA was reduced slightly to 5.5 grams, which resulted in Sample 2C remaining a liquid after 8 hours. Sample 2C eventually cured into a solid sealing composition.

Example 3: Resin 4 and IPDA Curing Agent

In Example 3, Resin 4 was mixed with different quantities of IPDA (isophoronediamine) curing agent to evaluate the curing time required for sealing compositions comprising Resin 4 and IPDA to change from a liquid phase to a solid or semi-solid phase. A quantity of 100 grams of Resin 4 at 200° F. (93.3° C.) was added to each of six containers. Quantities of 5 grams, 10 grams, 11 grams, 12 grams, 13, grams, and 14 grams of IPDA curing agent were added to the 100 grams of Resin 4 in one of each of the six containers, and the contents of each container were thoroughly mixed. The mixtures were heated using a hot roll to maintain the temperatures of the mixtures at 200° F. (93.3° C.). Changes in the color, phase, and hardness of each of the mixtures were observed over time. Observations of phase and hardness are subsequently provided in Table 4.

TABLE 4

Observations During Cure Time for
Resin 4 with IPDA Curing Agent

| Sample ID | Resin | Curing agent | Quantity of Resin (g) | Quantity of Curing Agent (g) | Observation |
|---|---|---|---|---|---|
| 3A | Resin 4 | IPDA | 100 | 10 | Liquid after 8 hrs, change in color |
| 3B | Resin 4 | IPDA | 100 | 5 | Liquid after 8 hrs, change in color |
| 3C | Resin 4 | IPDA | 100 | 11 | Liquid after 8 hrs, thickness increases |
| 3D | Resin 4 | IPDA | 100 | 12 | Liquid after 8 hrs, thickness increases |
| 3E | Resin 4 | IPDA | 100 | 13 | Liquid after 8 hrs, thickness increases |
| 3F | Resin 4 | IPDA | 100 | 14 | Liquid after 8 hrs, thickness increases |

For Samples 3A and 3B, the quantities of IPDA curing agent of 10 grams and 5 grams, respectively, were observed to produce a color change in the sealing compositions of Samples 3A and 3B after 8 hours. However, the amounts of the IPDA curing agent in Samples 3A and 3B did not produce an observable difference in viscosity of the sealing composition after 8 hours. While the color changes of Samples 3A and 3B indicate the existence of some degree of curing, the amounts of IPDA curing agent in Samples 3A and 3B did not fully cure the sealing composition within a cure time of less than 8 hours. Samples 3A and 3B eventually cured to a rubbery solid within a cure time of 24 hours.

For Samples 3C through 3F, the amount of IPDA curing agent was progressively increased from 11 grams in Sample 3C to 14 grams in Sample 3F. Sample 3C having 11 grams of IPDA curing agent per 100 grams of resin exhibited an observable thickening of the sealing composition after 8 hours of cure time. Samples 3D, 3E, and 3F also exhibited thickening of the sealing composition after 8 hours. However, Samples 3C through 3F did not fully cure to a semi-solid or solid composition after 8 hours of cure time. Thus, for a sealing composition comprising Resin 4 with IPDA as the curing agent, more than 14 grams of the IPDA curing agent per 100 grams of Resin 4 may be required to cure the sealing composition to at least a semi-solid composition in less than 12 hours.

Example 4: Resin 4 and DETA Curing Agent

In Example 4, Resin 4 was mixed with different quantities of DETA (diethylenetriamine) curing agent to evaluate the curing time required for sealing compositions comprising Resin 4 and DETA to change from a liquid phase to a solid or semi-solid phase. A quantity of 100 grams of Resin 4 at 200° F. (93.3° C.) was added to each of six containers. Quantities of 3 grams, 5 grams, 7 grams, 7.5 grams, 8 grams, and 9 grams of IPDA curing agent were added to the 100 grams of Resin 4 in one of each of the six containers, and the contents of each container were thoroughly mixed. The mixtures were heated using a hot roll to maintain the temperatures of the mixtures at 200° F. (93.3° C.). Changes in the color, phase, and hardness of each of the mixtures were observed over time. Observations of phase and hardness are subsequently provided in Table 5.

TABLE 5

Observations During Cure Time for
Resin 4 with DETA Curing Agent

| Sample ID | Resin | Curing agent | Quantity of Resin (g) | Quantity of Curing Agent (g) | Observation |
|---|---|---|---|---|---|
| 4A | Resin 4 | DETA | 100 | 3 | Liquid after 8 hrs |
| 4B | Resin 4 | DETA | 100 | 5 | Liquid after 8 hrs |
| 4C | Resin 4 | DETA | 100 | 7 | Semi-solid after 6 hrs and 10 min |
| 4D | Resin 4 | DETA | 100 | 7.5 | Semi-solid after 4 hrs and 50 min |
| 4E | Resin 4 | DETA | 100 | 8 | Semi-solid after 4 hrs |
| 4F | Resin 4 | DETA | 100 | 9 | Semi-solid after 3 hrs |

Samples 4A and 4B having 3 grams and 5 grams of DETA, respectively, were observed to be a liquid after a cure time of 8 hours. Therefore, the amounts of DETA in Samples 4A (3 grams) and 4B (5 grams) did not enable Resin 4 to cure to a semi-solid or solid in less than or equal to 8 hours. Samples 4A and 4B were observed to cure into a rubbery solid after a cure time of 24 hours. For Samples 4C-4F, the amounts of DETA added to Resin 4 were progressively increased from 7 grams to 9 grams. Sample 4C having 7 grams of DETA curing agent was observed to cure into a semi-solid composition after 6 hours and 10 minutes. Samples 4D-4F having 7.5 grams, 8 grams, and 9 grams of DETA, respectively, exhibited decreasing cure times to produce the semi-solid composition as the quantity of DETA was increased. Thus, it is observed that a sealing composition that includes Resin 4 and DETA as the curing agent may have an amount of DETA curing agent greater than 5 grams per 100 grams of Resin 4, without adding an accelerator. For example, the sealing composition may include Resin 4 and greater than or equal to 7 grams DETA curing agent per 100 grams of Resin 4. As the amount of DETA curing agent increases, the curing time decreases.

Example 5: Resin 4 and TETA

In Example 5, Resin 4 was mixed with different quantities of TETA (triethylenetetramine) curing agent to evaluate the curing time required for sealing compositions comprising Resin 4 and TETA to change from a liquid phase to a solid or semi-solid phase. A quantity of 100 grams of Resin 4 at 200° F. (93.3° C.) was added to each of five containers. Quantities of 2 grams, 3 grams, 4 grams, 5 grams, and 5.5 grams of TETA curing agent were added to the 100 grams of Resin 4 in one of each of the five containers, and the contents of each container were thoroughly mixed. The mixtures were heated using a hot roll to maintain the temperature of the mixtures at 200° F. (93.3° C.). Changes in the color, phase, and hardness of each of the mixtures were observed over time. Observations of phase and hardness are subsequently provided in Table 6.

TABLE 6

Observations During Cure Time for Resin 4 with TETA Curing Agent

| Sample ID | Resin | Curing agent | Quantity of Resin (g) | Quantity of Curing Agent (g) | Observation |
|---|---|---|---|---|---|
| 5A | Resin 4 | TETA | 100 | 2 | Liquid after 8 hrs, thickness increases |
| 5B | Resin 4 | TETA | 100 | 3 | Liquid after 8 hrs, thickness increases |
| 5C | Resin 4 | TETA | 100 | 4 | Liquid after 8 hrs, thickness increases |
| 5D | Resin 4 | TETA | 100 | 5 | Liquid after 8 hrs, thickness increases |
| 5E | Resin 4 | TETA | 100 | 5.5 | Semi-solid after 5 hrs and 45 min |

For Samples 5A-5D, the amount of TETA curing agent per 100 grams of Resin 4 was increased from 2 grams to 5 grams. Samples 5A-5D were all liquids after a cure time of 8 hours, but each of Samples 5A-5D exhibited observable thickening of the sealing composition comprising Resin 4 and TETA. Samples 5A-5D were observed to cure to a rubbery solid after a cure time of more than 12 hours. Sample 5E included 5.5 grams of TETA per 100 grams of Resin 4 and cured to a semi-solid composition after a cure time of 5 hours and 45 minutes. Therefore, it is observed that a sealing composition comprising Resin 4 and TETA curing agent may have greater than 5 grams TETA per 100 grams of Resin 4, or greater than or equal to 5.5 grams TETA per 100 grams of Resin 4, for the sealing composition to cure to at least a semi-solid composition in less than 8 hours without adding an accelerator.

The combination of Resin 4 and the TETA curing agent of Example 5 resulted in a faster rate of cure of the epoxy resin and a lesser cure time compared to combinations of Resin 4 with TEPA, IPDA, or DETA in Examples 2, 3, and 4, respectively. As previously discussed, the combination of Resin 4 with only 5.5 grams of TETA in Example 5 cured the sealing composition to a semi-solid composition in less than 6 hours. In comparison, the sealing composition of Example 2, in particular Sample 2C that included Resin 4 and 5.5 grams of TEPA, was still a liquid after 8 hours of curing. For the combination of Resin 4 and TEPA curing agent of Example 2, 6 grams TEPA per 100 grams of Resin 4 resulted in curing Resin 4 to a semi-solid composition in less than 8 hours.

Example 6: Resin 1 and TEPA Curing Agent

In Example 6, Resin 1 was mixed with different quantities of TEPA (tetraethylenepentamine) curing agent to evaluate the curing time required for sealing compositions comprising Resin 1 and TEPA to change from a liquid phase to a solid or semi-solid phase. A quantity of 100 grams of Resin 1 at 200° F. (93.3° C.) was added to each of four containers. Quantities of 1 gram, 2 grams, 3 grams, and 3.5 grams of TEPA curing agent were added to the 100 grams of Resin 1 in one of each of the four containers, and the contents of each container were thoroughly mixed. The mixtures were heated using a hot roll to maintain the temperature of the mixtures at 200° F. (93.3° C.). Changes in the color, phase, and hardness of each of the mixtures were observed over time. Observations of phase and hardness are subsequently provided in Table 7.

TABLE 7

Observations During Cure Time for Resin 1 with TEPA Curing Agent

| Sample ID | Resin | Curing agent | Quantity of Resin (g) | Quantity of Curing Agent (g) | Observation |
|---|---|---|---|---|---|
| 6A | Resin 1 | TEPA | 100 | 1 | Color changed, liquid after 6 hrs |
| 6B | Resin 1 | TEPA | 100 | 2 | Color changed, liquid after 8 hrs |
| 6C | Resin 1 | TEPA | 100 | 3 | Color changed, thickness increased after 8 hrs |
| 6D | Resin 1 | TEPA | 100 | 3.5 | Color changed, semi-solid after 4 hrs |

For Samples 6A and 6B, the quantities of TEPA curing agent of 1 gram and 2 grams, respectively, were observed to produce a color change in the sealing compositions of Samples 6A and 6B after 6 hours and 8 hours, respectively. While the color change of Samples 6A and 6B indicates the existence of some degree of curing of the Resin 1, the amounts of TEPA curing agent in Samples 6A and 6B did not produce an observable change in viscosity or cure Resin 1 into a semi-solid or solid composition in 8 hours or less. Samples 6A and 6B were observed to cure to a rubbery solid after a cure time of 12 hours.

For Sample 6C, the amount of TEPA was increased to 3 grams per 100 grams of Resin 1, which resulted in a change in color as well as an observable increase in the thickness (viscosity) of Resin 1 after a cure time of 8 hours. Increasing the amount of TEPA to 3.5 grams per 100 grams of Resin 1 in Sample 6D resulted in curing Resin 1 to a semi-solid composition after a cure time of 4 hours.

Example 7: Resin 1 and DETA Curing Agent

In Example 7, Resin 1 was mixed with different quantities of DETA (diethylenetriamine) curing agent to evaluate the curing time required for sealing compositions comprising Resin 1 and DETA to change from a liquid phase to a solid or semi-solid phase. A quantity of 100 grams of Resin 1 at 200° F. (93.3° C.) was added to each of three containers. Quantities of 3 grams, 5 grams, and 7 grams of DETA curing agent were added to the 100 grams of Resin 1 in one of each of the three containers, and the contents of each container were thoroughly mixed. The mixtures were heated using a hot roll to maintain the temperature of the mixtures at 200° F. (93.3° C.). Changes in the color, phase, and hardness of each of the mixtures were observed over time. Observations of phase and hardness are subsequently provided in Table 8.

TABLE 8

Observations During Cure Time for Resin 1 with DETA Curing Agent

| Sample ID | Resin | Curing agent | Quantity of Resin (g) | Quantity of Curing Agent (g) | Observation |
|---|---|---|---|---|---|
| 7A | Resin 1 | DETA | 100 | 3 | Semi-solid after 6 hrs and 20 min |
| 7B | Resin 1 | DETA | 100 | 5 | Semi-solid after 2 hrs and 15 min, solid after 24 hours |
| 7C | Resin 1 | DETA | 100 | 7 | Semi-solid after 1 hr and 10 min, solid after 8 hrs |

In Sample 7A, the combination of 100 grams of Resin 1 with 3 grams of DETA curing agent was observed to cure Resin 1 to a semi-solid composition after 6 hours and 20 minutes and to a rubbery solid after a cure time of 8 hours. As the amount of DETA curing agent is increased to 5 grams DETA per 100 grams of Resin 1 in Sample 7B and 7 grams DETA per 100 grams of Resin 1 in Sample 7C, the cure time needed to cure Resin 1 to a semi-solid composition, rubbery solid, or rigid solid composition decreases. As shown be the results for Sample 7A, a sealing composition that includes Resin 1 and DETA curing agent may need less than 5 grams of DETA, or even as little as 3 grams of DETA, to cure the sealing composition within a cure time of less than 12 hours, or even less than 8 hours, without including an accelerator.

Examples 8-11: Resin 2 and Various Curing Agents

In Examples 8-11, Resin 2 was mixed with different quantities of DETA (diethylenetriamine), TETA (triethylenetetramine), TEPA (tetraethylenepentamine), IPDA (isophoronediamine) curing agents to evaluate the curing time required for the various sealing compositions to change from a liquid phase to a solid or semi-solid phase. For Example 8, a quantity of 100 grams of Resin 2 at 200° F. (93.3° C.) was added to each of two containers. Quantities of 7 grams and 9 grams of DETA curing agent were added to the 100 grams of Resin 2 to each of the two containers, respectively. For Example 9, a quantity of 100 grams of Resin 2 at 200° F. (93.3° C.) was added to each of three containers. Quantities of 5.5 grams, 6 grams, and 8 grams of TETA curing agent were added to the 100 grams of Resin 2 to each of the three containers, respectively. For Example 10, a quantity of 100 grams of Resin 2 at 200° F. (93.3° C.) was added to each of two containers. Quantities of 15 grams and 20 grams of IPDA curing agent were added to the 100 grams of Resin 2 to each of the two containers, respectively. For Example 11, a quantity of 100 grams of Resin 2 at 200° F. (93.3° C.) was added to each of two containers. Quantities of 7 grams and 10 grams of TEPA curing agent were added to the 100 grams of Resin 2 to each of the two containers, respectively.

The contents of each container of Examples 8-11 were thoroughly mixed. The mixtures of Examples 8-11 were heated using a hot roll to maintain the temperature of the mixtures at 200° F. (93.3° C.). Changes in the color, phase, and hardness of each of the mixtures of Examples 8-11 were observed over time. Observations of phase and hardness for Examples 8-11 are subsequently provided in Table 9.

TABLE 9

Observations During Cure Time for Resin 2 with DETA (Example 8), TETA (Example 9), IPDA (Example 10), and TEPA (Example 11)

| Sample ID | Resin | Curing agent | Quantity of Resin (g) | Quantity of Curing Agent (g) | Observation |
|---|---|---|---|---|---|
| 8A | Resin 2 | DETA | 100 | 7 | Liquid after 8 hrs |
| 8B | Resin 2 | DETA | 100 | 9 | Liquid after 8 hrs |
| 9A | Resin 2 | TETA | 100 | 6 | Liquid after 8 hrs |
| 9B | Resin 2 | TETA | 100 | 5.5 | Liquid after 8 hrs |
| 9C | Resin 2 | TETA | 100 | 8 | Liquid after 8 hrs |
| 10A | Resin 2 | IPDA | 100 | 20 | Liquid after 8 hrs |
| 10B | Resin 2 | IPDA | 100 | 15 | Liquid after 8 hrs |
| 11A | Resin 2 | TEPA | 100 | 10 | Liquid after 8 hrs |
| 11B | Resin 2 | TEPA | 100 | 7 | Liquid after 8 hrs |

The compositions of Examples 8-11 cured to solid sealing compositions following additional cure time beyond eight hours. However, the compositions of Examples 8-11 that included Resin 2 included greater quantities of the curing agent to cure to a semi-solid state compared to the sealing compositions of Examples 1-7 that included Resin 1 or Resin 4.

Examples 12: Comparison of Resin 1 to a Mixture of Resin 1 and Resin 4

For Example 12, a sealing composition that included Resin 1 and TEPA curing agent was compared to a sealing composition that included a mixture of Resin 1 and Resin 4 with TEPA curing agent. For Sample 12A, 100 grams of Resin 1 at 200° F. (93.3° C.) was added to a container. 10 grams of TEPA curing agent and 24.63 grams of a weighting agent were added to the 100 grams of Resin 1 in the container. The weighting agent was manganese oxide ($Mn_3O_4$) and was added to adjust the density of Sample 12A so a measured density of 80 pounds per cubic foot (pcf). For Sample 12B, 80 grams of Resin 1 and 20 grams of Resin 4 at 200° F. (93.3° C.) were added to a container. 10 grams of TEPA curing agent was added to the mixture of Resin 1 and Resin 2 in the container. An amount of $Mn_3O_4$ weighting agent was added to adjust the density of Sample 12B to 80 pcf. A total amount of $Mn_3O_4$ added to Sample 12B was 26.10 grams.

The mixtures of Samples 12A and 12B were thoroughly mixed. The mixtures of Samples 12A and 12B were heated using a hot roll to maintain the temperature of the mixtures at 200° F. (93.3° C.). The elapsed time needed for each of Samples 12A and 12B to turn from a liquid to a semi-solid was measured. Changes in the color, phase, and hardness of each of the mixtures were observed over time. The cure time to a semi-solid material and observations of phase and hardness for Samples 12A and 12B are subsequently provided in Table 10.

TABLE 10

Observations During Cure Time for Resin 1 with TEPA Curing Agent Compared to a Mixture of Resin 1 and Resin 4 with TEPA Curing Agent.

| Sample ID | Quantity of Resin 1 (g) | Quantity of Resin 4 (g) | Quantity of TEPA (g) | Weighting Material (g) | Time to Semi-solid State (min) | Observations |
|---|---|---|---|---|---|---|
| 12A | 100 | 0 | 10 | 24.63 | 37 | The mixture was solid after 9 hrs. The mixture was harder in the middle than at the edges |
| 12B | 80 | 20 | 10 | 26.10 | 39 | The mixture was solid after 9 hrs. The mixture was harder in the middle than at the edges |

As shown in Table 10, both Sample 12A and Sample 12B cured to a semi-solid state in less than 40 minutes. The replacement of 20 grams of Resin 1 with 20 grams of Resin 4 in Sample 12B slightly decreased the curing rate, resulting in a slightly increased cure time compared to Sample 12A, which included only Resin 1. Thus, the cure time may be adjusted by combining an amount of Resin 4 with Resin 1 in the sealing composition.

Example 13: Curing Time for Sealing Compositions Comprising Mixtures of Resin 1 and Resin 4 with DETA Curing Agent For Example 13, sealing compositions comprising various mixtures of Resin 1 and Resin 2 were evaluated with different amounts of DETA curing agent. For Samples 13A, 13B, and 13C, 80 grams of Resin 1 and 20 grams of Resin 4 at 200° F. (93.3° C.) were added to each of three containers. Quantities of 7 grams, 5 grams, and 3 grams of DETA curing agent were added to each of the three containers, respectively. For Samples 13D and 13E, 50 grams of Resin 1 and 50 grams of Resin 4 at 200° F. (93.3° C.) were added to each of two containers. Quantities of 7 grams and 5 grams of DETA curing agent were added to each of the two containers, respectively. For Samples 13F, 13G, and 13H, 30 grams of Resin 1 and 70 grams of Resin 4 at 200° F. (93.3° C.) were added to each of three containers. Quantities of 7 grams, 5 grams, and 3 grams of DETA curing agent were added to each of the three containers, respectively.

The mixtures of Samples 13A-13H were thoroughly mixed. The mixtures of Samples 13A-13H were heated using a hot roll to maintain the temperature of the mixtures at 200° F. (93.3° C.). The elapsed time needed for each of Samples 13A-13H to turn from a liquid to a semi-solid was measured in minutes (min). Changes in the color, phase, and hardness of each of the mixtures were observed over time. The cure time to a semi-solid material and observations of phase and hardness for Samples 13A-13H are subsequently provided in Table 11.

TABLE 11

Observations During Cure Time for Various Mixtures of Resin 1 and Resin 4 with DETA Curing Agent.

| Sample ID | Quantity of Resin 1 (g) | Quantity of Resin 4 (g) | Quantity of DETA (g) | Time to Semi-solid State (min) | Observations |
|---|---|---|---|---|---|
| 13A | 80 | 20 | 7 | 72 | Semi-solid after 1 hr and 12 min, solid after 8 hrs |
| 13B | 80 | 20 | 5 | 120 | Semi-solid after 2 hrs, solid after 24 hrs |
| 13C | 80 | 20 | 3 | 385 | Semi-solid after 6 hrs and 25 min |

TABLE 11-continued

Observations During Cure Time for Various Mixtures of Resin 1 and Resin 4 with DETA Curing Agent.

| Sample ID | Quantity of Resin 1 (g) | Quantity of Resin 4 (g) | Quantity of DETA (g) | Time to Semi-solid State (min) | Observations |
|---|---|---|---|---|---|
| 13D | 50 | 50 | 7 | 130 | Semi-solid after 2 hr and 10 min |
| 13E | 50 | 50 | 5 | 260 | Semi-solid after 4 hrs and 20 min, solid after 24 hrs |
| 13F | 30 | 70 | 7 | 170 | Semi-solid after 2 hrs and 50 min, hard rubber after 8 hrs |
| 13G | 30 | 70 | 5 | 170 | Semi-solid after 2 hrs and 50 min, solid after 24 hrs |
| 13H | 30 | 70 | 3 | 480+ | Liquid after 8 hrs |

As shown in Table 11, the curing time increases as the weight ratio of Resin 1 to Resin 4 decreases. As previously observed, the cure time increases with increasing quantities of the curing agent. Samples 13C, 13E, and 13H had curing times to transition from a liquid to a semi-solid of greater than 4 hours. This makes the sealing compositions of Samples 13C, 13E, and 13H more suited to primary sealing of the wellbore annulus or casing-casing annuli. Samples 13C, 13E, and 13H may also be used in remedial actions to repair the wellbore. Samples 13A, 13B, 13D, 13F, and 13G had curing times to transition from a liquid to a semi-solid of less than 4 hours. These sealing compositions may be suited for use as lost circulation materials for remediating a lost circulation in a wellbore due to the reduced cure times compared to compositions with reduced proportions of the curing agent. Samples 13A, 13B, 13D, 13F, and 13G may also be suited for remedial actions to repair the wellbore.

Example 14: Thickening Time Test for Downhole Application of the Sealing Composition to Remediate Increased Casing-Casing Annulus Pressure Condition In Example 14, a sealing composition was used in a "squeeze" operation to remediate a section of a wellbore exhibiting casing-casing annulus pressure increase. A sealing composition comprising 77 wt. % Resin 1, 19 wt. % Resin 4, and 2 wt. % TEPA curing agent was prepared and mixed for a mixing time of 30 minutes. The remediation area was at a depth of 12,000 feet below the surface. The sealing composition was pumped down the wellbore and squeezed into the remediation area. During the squeezing operation, the bottom hole circulating temperature (BHCT) was 223° F. (106° C.), and the bottom hole static temperature (BHST) was 260° F. (127° C.). The pressure was ramped up over a period of 30 minutes to a final pressure of 5700 pounds per square inch (psi) (39,300 kilopascals). The thickening time of the sealing composition was 4 hours and 15 minutes. The final Bearden consistency of the sealing composition was 100 Bc. The thickening time and Bearden consistency were measured using a high temperature high pressure (HTHP) consistometer obtained from Chandler Engineering. It was observed that the sealing composition remediated the weak zone in the remediation area to reduce the downhole casing-casing annulus pressure increase.

Comparative Example 15: Conventional Cement Composition

In Comparative Example 15, two samples of a conventional cement composition were prepared. The conventional cement composition included Portland cement, silica, a weighting agent, an expanding additive, a defoamer, a latex additive and latex stabilizer, a fluid loss additive, a cement friction reducer, a cement retarder and water. The formulation for the conventional cement composition of Comparative Example 15 is shown in Table 12, which is subsequently provided in this disclosure. Samples 15A and 15B were prepared using the same formulation of the conventional cement composition. The conventional cement compositions of Samples 15A and 15B were 160 pounds per cubic foot (lbm/ft$^3$) (2563 kilograms per cubic meter (kg/m$^3$), where 1 lbm/ft$^3$ is equal to 119.8 kg/m$^3$).

Example 16: Sealing Composition Including the Epoxy Resin System and Constituents of Conventional Cement In Example 16, a sealing composition was prepared by replacing the latex and latex stabilizer of the conventional cement composition of Comparative Example 15 with the epoxy resin system and adjusting the formulation to achieve a density comparable to the conventional cement compositions of Comparative Example 15. The epoxy resin in the sealing composition of Example 16 included a mixture of bisphenyl-A-epichlorohydrin epoxy resin and butyl glycidyl ether, and the curing agent was diethyl toluene diamine (DETDA). The formulation for the sealing composition of Example 16 is shown in Table 12, subsequently provided in this disclosure. Two samples of the sealing composition of Example 16 (Samples 16A and 16B) were prepared using the same formulation.

TABLE 12

Formulations for the conventional cement compositions of Comparative Example 15 and for the sealing composition of Example 16. All weights in Table 12 are provided in grams (g).

| Component | 15A | 15B | 16A | 16B |
|---|---|---|---|---|
| Portland Cement (g) | 481.01 | 481.01 | 461.07 | 461.07 |
| Silica powder (g) | 168.35 | 168.35 | 193.65 | 193.65 |

TABLE 12-continued

Formulations for the conventional cement compositions of Comparative Example 15 and for the sealing composition of Example 16. All weights in Table 12 are provided in grams (g).

| Component | 15A | 15B | 16A | 16B |
|---|---|---|---|---|
| Weighting materials (g) | 625.32 | 625.32 | 599.40 | 599.40 |
| Expanding additive (g) | 4.81 | 4.81 | 13.83 | 13.83 |
| Defoamer (g) | 1.18 | 1.18 | 1.13 | 1.13 |
| Latex additive (g) | 42.58 | 42.58 | — | — |
| Latex stabilizer (g) | 9.05 | 9.05 | — | — |
| Fluid loss additive (g) | 0.48 | 0.48 | 1.84 | 1.84 |
| Cement friction reducer (g) | 3.85 | 3.85 | 4.61 | 4.61 |
| Cement retarder (g) | 5.29 | 5.29 | 4.97 | 4.97 |
| Epoxy resin (g) | — | — | 34.58 | 34.58 |
| Curing agent (g) | — | — | 9.34 | 9.34 |
| Water (g) | 195.85 | 195.85 | 203.27 | 203.27 |
| Total (g) | 1537.77 | 1537.77 | 1527.69 | 1527.69 |
| Density (lbm/ft$^3$) | 160 | 160 | 159 | 159 |

Example 17: Evaluation of the Impact of Adding Epoxy Resin System on Elasticity, Compressive Strength, and Bond Strength of the Sealing Composition The conventional cement compositions of Comparative Example 15 and the sealing compositions of Example 16 were evaluated for compressive strength and bond strength according to the shear bond test previously described in this disclosure. The results for the compressive strength and shear bond strength of the conventional cement composition of Comparative Example 15 and the sealing composition of Example 16 are provided subsequently in this disclosure in Table 13.

TABLE 13

Comparison of Compressive Strength and Shear Bond Strength for the Conventional Cement Compositions of Comparative Example 15 and the Sealing Compositions of Example 16.

| Sample No. | Cement Contact Height on Pipe (in) | Inside Diameter of Outside Pipe (in) | Cement Contact Area (in$^2$) | Maximum Force Applied to Sample (lbf) | Shear Bond Strength (psi) |
|---|---|---|---|---|---|
| 15A | 3.99 | 2.5 | 31.32 | 11250 | 359 |
| 15B | 3.88 | 2.5 | 30.45 | 12190 | 400 |
| 16A | 3.81 | 2.5 | 29.90 | 14230 | 476 |
| 16B | 3.93 | 2.5 | 30.85 | 16700 | 541 |

As shown in Table 13, the sealing composition of Example 16 having the epoxy resin system added (e.g., average of Samples 16A and 16B) exhibited an average bond strength of 509 psi, which was significantly greater than the average bond strength of 378 psi for the conventional cement compositions of Comparative Example 15 (e.g., average of Samples 15A and 15B). Additionally, the sealing compositions of Example 16 having the epoxy resin system added (e.g., Samples 16A and 16B) were able to withstand a greater amount of force (e.g., average of 15,465 lbf) applied to the compositions compared to the conventional cement compositions of Comparative Example 15 (e.g., Samples 15A and 15B), which were subjected to an average of 11,720 psi. Thus, the sealing compositions having the epoxy resin system according to embodiments of the present disclosure are shown to exhibit greater compressive strength and the shear bond strength compared to conventional cement compositions.

The conventional cement compositions of Comparative Example 15 and the sealing compositions of Example 16 were also evaluated for bulk modulus. The sealing compositions of Example 16 having the epoxy resin system added (e.g., Samples 16A and 16B) exhibited a bulk modulus of about 1,184,000 psi, which was less than the static bulk modulus of 1,404,000 psi determined for the conventional cement compositions of Comparative Example 15 (e.g., Samples 15A and 15B). Lesser bulk modulus indicates that the material exhibits greater elasticity. Thus, it has been shown in Example 17 that the sealing compositions of Example 16 having the epoxy resin system added exhibited greater elasticity compared to the conventional cement compositions of comparative Example 15.

It is noted that one or more of the following claims utilize the term "where" or "in which" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising." For the purposes of defining the present technology, the transitional phrase "consisting of" may be introduced in the claims as a closed preamble term limiting the scope of the claims to the recited components or steps and any naturally occurring impurities. For the purposes of defining the present technology, the transitional phrase "consisting essentially of" may be introduced in the claims to limit the scope of one or more claims to the recited elements, components, materials, or method steps as well as any non-recited elements, components, materials, or method steps that do not materially affect the novel characteristics of the claimed subject matter. The transitional phrases "consisting of" and "consisting essentially of" may be interpreted to be subsets of the open-ended transitional phrases, such as "comprising" and "including," such that any use of an open ended phrase to introduce a recitation of a series of elements, components, materials, or steps should be interpreted to also disclose recitation of the series of elements, components, materials, or steps using the closed terms "consisting of" and "consisting essentially of." For example, the recitation of a composition "comprising" components A, B, and C should be interpreted as also disclosing a composition "consisting of" components A, B, and C as well as a composition "consisting essentially of" components A, B, and C. Any quantitative value expressed in the present application may be considered to include open-ended embodiments consistent with the transitional phrases "comprising" or "including" as well as closed or partially closed embodiments consistent with the transitional phrases "consisting of" and "consisting essentially of."

As used in the Specification and appended Claims, the singular forms "a", "an", and "the" include plural references unless the context clearly indicates otherwise. The verb "comprises" and its conjugated forms should be interpreted as referring to elements, components or steps in a non-exclusive manner. The referenced elements, components or steps may be present, utilized or combined with other elements, components or steps not expressly referenced.

It should be understood that any two quantitative values assigned to a property may constitute a range of that property, and all combinations of ranges formed from all stated quantitative values of a given property are contemplated in this disclosure. The subject matter of the present disclosure has been described in detail and by reference to specific embodiments. It should be understood that any detailed description of a component or feature of an embodiment does not necessarily imply that the component or feature is essential to the particular embodiment or to any other embodiment. Further, it should be apparent to those skilled in the art that various modifications and variations can be made to the described embodiments without departing from the spirit and scope of the claimed subject matter.

What is claimed is:

1. A composition for sealing an annulus of a wellbore, the composition comprising:
from 20 weight percent to 97 weight percent epoxy resin based on the total weight of the composition, the epoxy resin comprising at least one of 2,3-epoxypropyl o-tolyl ether, alkyl glycidyl ethers having from 12 to 14 carbon atoms, or a compound having formula (I):

$$(OC_2H_3)-CH_2-O-R^1-O-CH_2-(C_2H_3O) \quad (I)$$

where $R^1$ is a linear or branched hydrocarbyl having from 4 to 24 carbon atoms;
and
from 1 weight percent to 20 weight percent curing agent based on the total weight of the composition,
where the composition cures to seal the annulus, and the cured composition withstands temperatures of from 20 degrees Celsius (° C.) to 205° C. and pressures of from 14 pounds of force per square inch (psi) to 4,000,000 psi without failure.

2. The composition of claim 1 where the curing agent comprises at least one of tetraethylenepentamine (TEPA), diethylenetriamine (DETA), triethylenetetramine (TETA), or isophoronediamine (IPDA).

3. The composition of claim 1 where the epoxy resin has an epoxy value of from 4.5 epoxy equivalents per kilogram to 5.5 epoxy equivalents per kilogram.

4. The composition of claim 1 where the epoxy resin has an epoxy equivalent weight of from 150 to 350 grams per epoxy equivalent.

5. The composition of claim 1 further comprising an accelerator.

6. The composition of claim 1 where the epoxy resin further comprises a reactive diluent.

7. The composition of claim 6 where the reactive diluent has the formula $R-O-CH_2-(C_2H_3O)$, where R is a hydrocarbyl having from 12 to 14 carbon atoms.

8. The composition of claim 1 where the composition has a cure time of from 4 hours to 12 hours.

9. The composition of claim 1 where the composition has a density of from 55 pounds per cubic foot to 170 pounds per cubic foot.

10. The composition of claim 1 where the viscosity of the composition is from 1 millipascal seconds (mPas) to 50,000 mPa·s.

11. The composition of claim 1 where the epoxy resin comprises the 2,3-epoxypropyl o-tolyl ether.

12. The composition of claim 1 where the epoxy resin further comprises from 0.1 weight percent to 80 weight percent bisphenol-A-epichlorohydrin epoxy resin based on the total weight of the epoxy resin in the composition.

13. The composition of claim 1 where the epoxy resin comprises the compound having formula (I), and the compound is 1,6-hexanediol diglycidyl ether.

14. The composition of claim 1 where the epoxy resin comprises the compound having formula (I), and the compound is 1,6-hexanediol diglycidyl ether and the epoxy resin further comprises bisphenol-A-epichlorohydrin epoxy resin.

15. The composition of claim 1 further comprising a weighting material.

16. The composition of claim 1, where the wellbore has an injectivity factor of greater than 4000 pounds of force per square inch·min per barrel (psi·min/bbl).

17. A composition for sealing an annulus of a wellbore, the composition comprising:
from 20 weight percent to 97 weight percent epoxy resin based on the total weight of the composition, the epoxy resin comprising bisphenol-A-epichlorohydrin epoxy resin modified with a reactive diluent having formula $R^2-O-CH_2-(C_2H_3O)$, where $R^2$ is hydrocarbyl having from 12 to 14 carbon atoms; and
from 1 weight percent to 20 weight percent curing agent based on the total weight of the composition,
where the composition cures to seal the annulus, and the cured composition withstands temperatures of from 20 degrees Celsius (° C.) to 205° C. and pressures of from 14 pounds of force per square inch (psi) to 4,000,000 psi without failure.

18. The composition of claim 17 where the epoxy resin comprises from 1 weight percent to 20 weight percent of the reactive diluent based on the total weight of the epoxy resin in the composition.

19. The composition of claim 17 where the epoxy resin further comprises at least one of 2,3-epoxypropyl o-tolyl ether, alkyl glycidyl ethers having from 12 to 14 carbon atoms, or a compound having formula (I):

$$(OC_2H_3)-CH_2-O-R^1-O-CH_2-(C_2H_3O) \quad (I)$$

where $R^1$ is a linear or branched hydrocarbyl having from 4 to 24 carbon atoms.

20. The composition of claim 17 where the curing agent comprises at least one of tetraethylenepentamine (TEPA), diethylenetriamine (DETA), triethylenetetramine (TETA), or isophoronediamine (IPDA).

21. The composition of claim 17 where the epoxy resin further comprises from 1 weight percent to 80 weight percent 1,6-hexanediol diglycidyl ether based on the total weight of the epoxy resin in the composition.

22. The composition of claim 17, where the wellbore has an injectivity factor of greater than 4000 psi·min/bbl.

* * * * *